US011212251B2

(12) United States Patent
Ku et al.

(10) Patent No.: US 11,212,251 B2
(45) Date of Patent: *Dec. 28, 2021

(54) ENABLING INTERNET PROTOCOL CARRIER PEERING TO FOREIGN NETWORK DOMAINS

(71) Applicant: AT&T Intellectual Property I, L.P., Atlanta, GA (US)

(72) Inventors: Bernard S. Ku, Austin, TX (US); Lakshminarashimhan Naidu, Pearland, TX (US); Andrew Jurczak, Pinckney, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/790,865

(22) Filed: Feb. 14, 2020

(65) Prior Publication Data

US 2020/0186491 A1    Jun. 11, 2020

Related U.S. Application Data

(63) Continuation of application No. 15/851,213, filed on Dec. 21, 2017, now Pat. No. 10,567,336.

(51) Int. Cl.
*H04L 12/66* (2006.01)
*H04M 3/42* (2006.01)
(Continued)

(52) U.S. Cl.
CPC ........ *H04L 61/157* (2013.01); *H04L 61/1511* (2013.01); *H04L 65/1016* (2013.01);
(Continued)

(58) Field of Classification Search
None
See application file for complete search history.

(56) References Cited

U.S. PATENT DOCUMENTS 7,277,697 B2 * 10/2007 Desai ............... H04L 51/24
370/257
7,499,729 B2 * 3/2009 Lie ................. H04M 1/72
370/260

(Continued)

OTHER PUBLICATIONS

U.S. Office Action dated Jun. 14, 2019 in U.S. Appl. No. 15/851,213.
(Continued)

*Primary Examiner* — Sai Aung
(74) *Attorney, Agent, or Firm* — Hartman & Citrin LLC

(57) ABSTRACT

Concepts and technologies pertaining to enabling internet protocol carrier peering to foreign network domains are provided. A method includes identifying, by a computer system executing within an originating carrier network, a plurality of numbering plan area identifiers corresponding to a receiving carrier network. The method further includes accessing, by the computer system executing within the originating carrier network based on the plurality of numbering plan area identifiers, a plurality of numbering plan area zone file records stored on a private enabled telephone number mapping server. The method also includes creating, by the computer system executing within the originating carrier network, a single instance of a name authority pointer record placeholder within each of the plurality of numbering plan area zone file records stored on the private enabled telephone number mapping server.

17 Claims, 8 Drawing Sheets

(51) Int. Cl.
  *H04L 29/12* (2006.01)
  *H04L 29/06* (2006.01)
  *H04M 7/00* (2006.01)
  *H04M 7/12* (2006.01)

(52) U.S. Cl.
  CPC ...... *H04L 65/1069* (2013.01); *H04M 7/0075* (2013.01); *H04M 7/128* (2013.01)

(56) References Cited

U.S. PATENT DOCUMENTS

| | | | |
|---|---|---|---|
| 7,747,265 B1 * | 6/2010 | Ruf | H04W 76/40 455/466 |
| 7,769,392 B2 * | 8/2010 | Russell | H04M 3/54 455/456.1 |
| 7,876,888 B2 * | 1/2011 | Chatterjee | H04M 3/436 379/201.01 |
| 7,974,295 B2 | 7/2011 | Tuohino et al. | |
| 8,223,630 B2 | 7/2012 | Yasrebi et al. | |
| 8,301,130 B1 * | 10/2012 | Gunasekara | H04M 1/72412 455/418 |
| 8,638,780 B1 | 1/2014 | Zhang | |
| 8,681,774 B2 | 3/2014 | Ku | |
| 8,693,464 B2 * | 4/2014 | Ku | H04W 76/12 370/352 |
| 8,737,592 B2 | 5/2014 | Gregorat et al. | |
| 8,914,525 B2 | 12/2014 | Ku | |
| 9,124,603 B2 * | 9/2015 | Jackson | H04L 29/12896 |
| 9,294,348 B2 | 3/2016 | Zampiello et al. | |
| 9,647,980 B2 | 5/2017 | Ku et al. | |
| 9,712,341 B2 | 7/2017 | Nas | |
| 9,716,788 B2 | 7/2017 | Bendi et al. | |
| 2008/0285543 A1 * | 11/2008 | Qiu | H04L 69/40 370/352 |
| 2016/0212177 A1 | 7/2016 | Xu et al. | |
| 2017/0006164 A1 | 1/2017 | Ku et al. | |
| 2017/0126750 A1 | 5/2017 | Ku et al. | |
| 2017/0171251 A1 | 6/2017 | Ku et al. | |
| 2017/0180567 A1 * | 6/2017 | Sharma | H04M 3/42153 |
| 2017/0244663 A1 | 8/2017 | Ku et al. | |

OTHER PUBLICATIONS

U.S. Notice of Allowance dated Sep. 25, 2019 in U.S. Appl. No. 15/851,213.

* cited by examiner

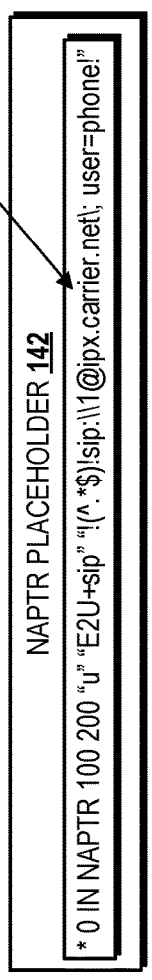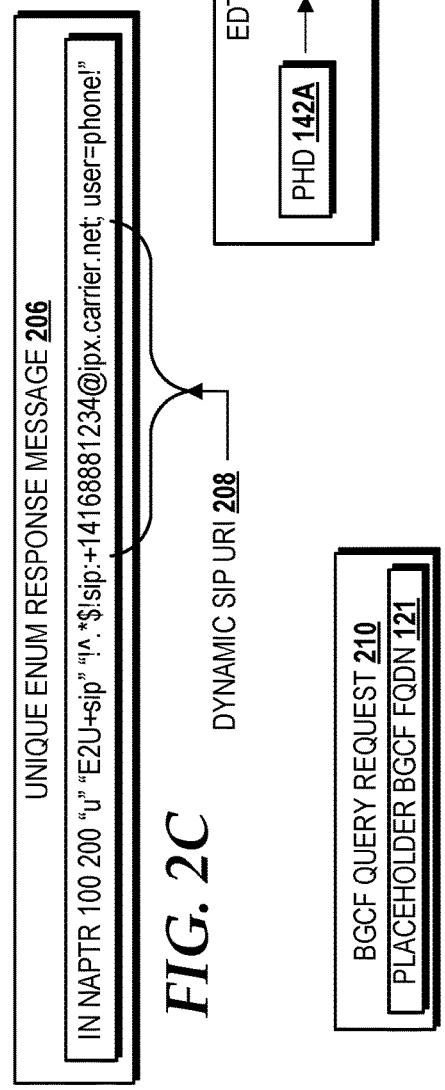

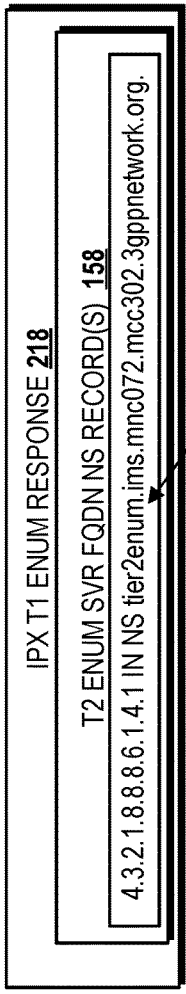

ENABLING INTERNET PROTOCOL CARRIER PEERING TO FOREIGN NETWORK DOMAINS

CROSS-REFERENCE TO RELATED APPLICATIONS

This application is a continuation of and claims priority to U.S. patent application Ser. No. 15/851,213, entitled "Enabling Internet Protocol Carrier Peering to Foreign Network Domains," filed Dec. 21, 2017, now U.S. Pat. No. 10,567,336, which is incorporated herein by reference in its entirety.

BACKGROUND

Telecommunications systems provide consumers with telephony services that enable user equipment to access a variety of content. Consumers are not bound to specific locations when communicating with others via their user equipment due to content access being available via the Internet over wireless connections. To enable the services that provide communication and access to multimedia resources, service providers may support internet-based calls, as well as provide Internet Protocol (IP)-based access for the execution of software services and applications. In order to handle large volumes of requests for content from user equipment, service providers can attempt to manage network traffic associated with the connection of call sessions in an efficient manner.

While network technologies can provide substantial benefits to consumers, technical challenges can occur when performing intercarrier communications. In some instances, telecommunications carriers and their accompanying networks conventionally operate independently of other communication carriers (and the other communication carriers' accompanying networks). Accordingly, subscribers from one carrier may not be able to automatically partake in IP-to-IP services with subscribers from another carrier. To illustrate, if an originating carrier attempts to use a received telephone number without verifying an IP routing path to a destination device (served by a receiving carrier) that is a target of an IP call session, then the originating carrier may discover that the received telephone number is associated with a device that cannot participate in the IP call session, thereby potentially causing the denial of the IP call session and instead proceeding to complete the call using a non-IP connection, such as a public switched telephone network (PSTN) or a cellular 2G or 3G connection. While this form of call completion can enable voice communications to proceed, advantages of an IP connection (e.g., high-definition audio quality, decreased operating costs, and feature rich IP data) can be diminished.

SUMMARY

The present disclosure is directed to enabling internet protocol carrier peering to foreign network domains. According to one aspect of the concepts and technologies disclosed herein, a method is disclosed. The method can include identifying, by a computer system executing within an originating carrier network, a plurality of numbering plan area identifiers corresponding to a receiving carrier network. The method also can include accessing, by the computer system executing within the originating carrier network based on the plurality of numbering plan area identifiers, a plurality of numbering plan area zone file records stored on a private enabled telephone number mapping server. The method further can include creating, by the computer system executing within the originating carrier network, a single instance of a name authority pointer record placeholder within each of the plurality of numbering plan area zone file records stored on the private enabled telephone number mapping server. In some embodiments, each numbering plane area zone file record includes the one, single instance of the name authority pointer record placeholder instead of a plurality of name authority pointer records. In some embodiments, the method can further include removing, from within each of the plurality of numbering plan area zone file records, a plurality of telephone numbers stored as name authority pointer records corresponding to one of the plurality of numbering plan area identifiers. In some embodiments, the single instance of the name authority pointer record placeholder replaces the plurality of telephone numbers stored as separate name authority pointer records within each of the plurality of numbering plan area zone file records. In some embodiments, the private enabled telephone number mapping server is associated with the originating carrier network. In some embodiments, the originating carrier network is associated with a domestic carrier and the receiving carrier network is associated with a foreign carrier. In some embodiments, the name authority pointer record placeholder instructs the private enable telephone number mapping server to generate a unique enabled telephone number mapping response message in response to receiving a private enabled telephone number mapping query that provides a telephone number to place an internet protocol call to the receiving carrier. In some embodiments, the unique enabled telephone number mapping response message directs the originating carrier network to access an external domain table. In some embodiments, the unique enabled telephone number mapping response message triggers the originating carrier network to map the name authority pointer record placeholder to a placeholder breakout gateway control functions fully qualified domain name via the external domain table, where the placeholder breakout gateway control functions fully qualified domain name.

According to another aspect of the concepts and technologies disclosed herein, a system is disclosed. In some embodiments, the system can be associated with an originating carrier network. The system can include a processor and a memory. The memory stores computer-executable instructions that, in response to being executed by the processor, cause the processor to perform operations. The operations can include identifying a plurality of numbering plan area identifiers corresponding to a receiving carrier network. The operations further can include accessing, based on the plurality of numbering plan area identifiers, a plurality of numbering plan area zone file records stored on a private enabled telephone number mapping server associated with the originating carrier network. The operations also can include creating a single instance of a name authority pointer record placeholder within each of the plurality of numbering plan area zone file records stored on the private enabled telephone number mapping server. In some embodiments, each numbering plane area zone file record includes the single instance of the name authority pointer record placeholder instead of a plurality of name authority pointer records.

In some embodiments, the operations further can include removing, from within each of the plurality of numbering plan area zone file records, a plurality of telephone numbers stored as name authority pointer records corresponding to one of the plurality of numbering plan area identifiers. In some embodiments, the single instance of the name authority pointer record placeholder replaces the plurality of telephone numbers stored as separate name authority pointer records within each of the numbering plan area zone file records. In some embodiments, the private enabled telephone number mapping server is associated with the originating carrier network. In some embodiments, the originating carrier is associated with a domestic carrier and the receiving carrier network is associated with a foreign carrier. In some embodiments, the name authority pointer record placeholder instructs the private enabled telephone number mapping server to generate a unique enabled telephone number mapping response message in response to receiving a private enabled telephone number mapping query that provides a telephone number to place an internet protocol call to the receiving carrier network. In some embodiments, the unique enabled telephone number mapping response message directs the originating carrier to access an external domain table. In some embodiments, the unique enabled telephone number mapping response message prevents a record not found message from being provided to the originating carrier network. In some embodiments, the unique enabled telephone number mapping response message triggers the originating carrier network to map the name authority pointer record placeholder to a placeholder breakout gateway control functions fully qualified domain name via the external domain table, where the placeholder breakout gateway control functions fully qualified domain name.

According to yet another aspect, a computer storage medium is disclosed. The computer storage medium can have computer-executable instructions stored thereon. When the computer-executable instructions are executed by a processor, the processor can perform operations including identifying, within an originating carrier network, a plurality of numbering plan area identifiers corresponding to a receiving carrier network. The operations further can include accessing, based on the plurality of numbering plan area identifiers, a plurality of numbering plan area zone file records stored on a private enabled telephone number mapping server. The operations also can include creating a single instance of a name authority pointer record placeholder within each of the plurality of numbering plan area zone file records stored on the private enabled telephone number mapping server. In some embodiments, each numbering plane area zone file record comprises the single instance of the name authority pointer record placeholder instead of a plurality of name authority pointer records. In some embodiments, the private enabled telephone number mapping server is associated with the originating carrier network. In some embodiments, the originating carrier network is associated with a domestic carrier and the receiving carrier network is associated with a foreign carrier. In some embodiments, the name authority pointer record placeholder instructs the private enabled telephone number mapping server to generate a unique enabled telephone number mapping response message in response to receiving a private enabled telephone number mapping query that provides a telephone number to place an internet protocol call to the receiving carrier network. In some embodiments, the unique enabled telephone number mapping response message directs the originating carrier to access an external domain table. In some embodiments, the unique enabled telephone number mapping response message prevents a record not found message from being provided to the originating carrier network. In some embodiments, the unique enabled telephone number mapping response message triggers the originating carrier network to map the name authority pointer record placeholder to a placeholder breakout gateway control functions fully qualified domain name via the external domain table, where the placeholder breakout gateway control functions fully qualified domain name.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

Other systems, methods, and/or computer program products according to embodiments will be or become apparent to one with skill in the art upon review of the following drawings and detailed description. It is intended that all such additional systems, methods, and/or computer program product included within this description be within the scope of this disclosure.

BRIEF DESCRIPTION OF THE DRAWINGS

FIGS. 2A-2J are block diagrams illustrating aspects of messages for enabling internet protocol peering to foreign network domains, according to an illustrative embodiment of the concepts and technologies described herein.

DETAILED DESCRIPTION

Figure 1:
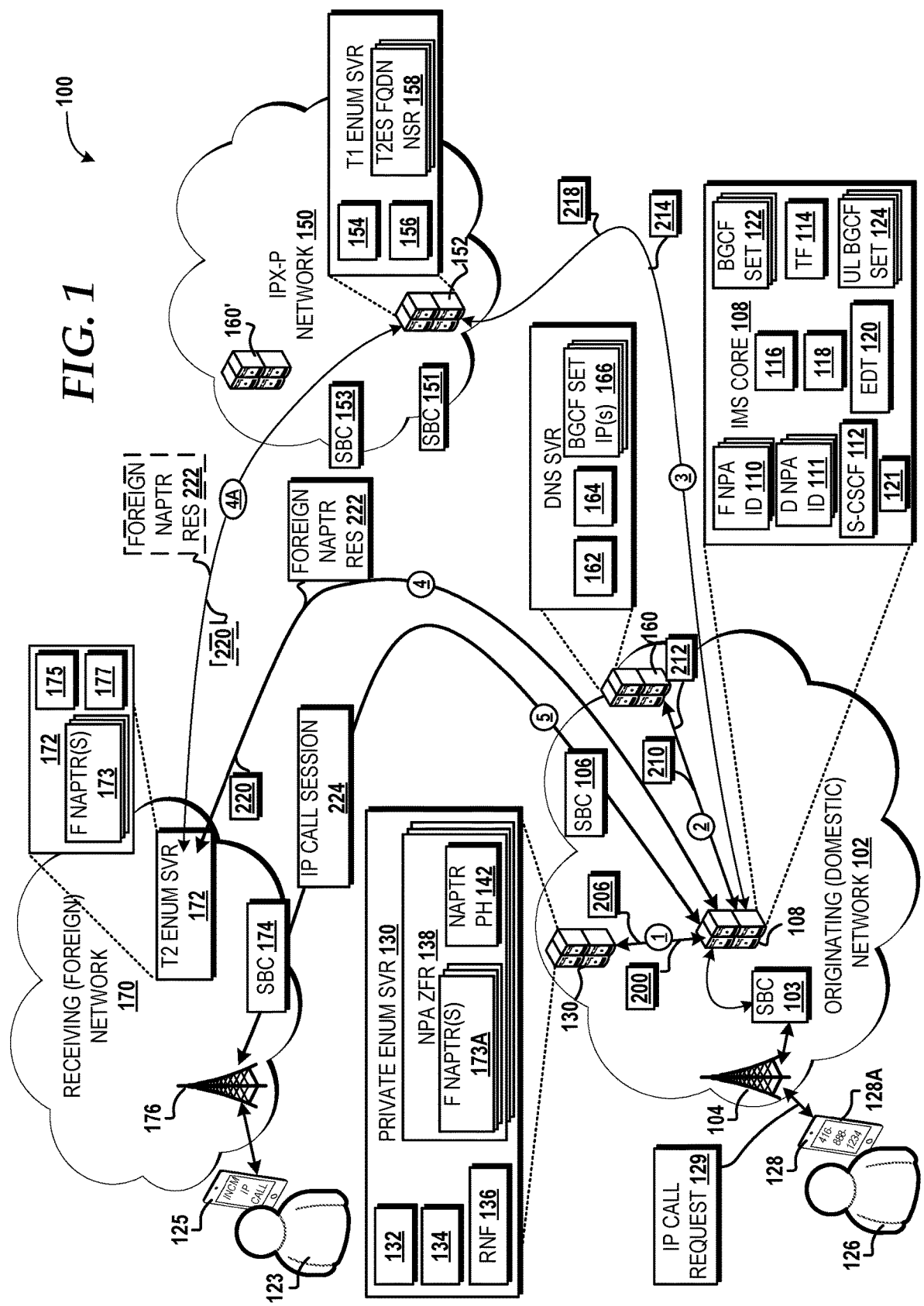
FIG. 1 is a system diagram showing an operating environment for various embodiments of the concepts and technologies described herein.

The following detailed description is directed to concepts and technologies for enabling internet protocol (IP) carrier peering to foreign network domains. Telecommunications carriers and their accompanying networks typically operate independently from other telecommunications carriers (and the other telecommunication carriers' networks). When multiple telecommunications carriers provide service within generally the same geographical boundaries or territory (e.g., within the same country, national territory, or other (un)defined boundary) and/or under the same laws (e.g., conforming the telecommunications networks to standards and rules set forth by a governing agency, such as the Federal Communications Commission), the telecommunications carriers may be referred to as "domestic carriers," and their domestic carrier network(s) may collectively be assigned telephone numbers within a first set of Numbering Plan Areas (NPAs) for a defined region. As such, a "domestic carrier network" (hereinafter "domestic network") includes a network that can provide service and/or assign telephone numbers that correspond with an NPA within the first set of NPAs for the defined region. Foreign telecommunication carriers (i.e., carriers that are not considered to be a domestic carrier) may be referred to as "foreign carriers," and their foreign carrier networks may operate outside of the defined region corresponding with the first set of NPAs for the domestic carrier(s), and instead may be associated with a different set of NPAs, such as a second set of NPAs, that do not overlap with the first set of NPAs. As such, a "foreign network" includes a network that can provide services and/or assign telephone numbers that correspond with an NPA within the second set of NPAs for a defined region corresponding to the foreign carriers, where none of the NPAs from the second set of NPAs associated with the foreign carriers overlaps or is shared with the NPAs from the first set of NPAs associated with the domestic carriers. For example, all NPAs assigned to the United States may be different than the NPAs assigned to Mexico. The first set of NPAs can be allocated to domestic networks only within the United States, whereas the second set of NPAs can be allocated to foreign networks only within a country that is not the United States or jurisdiction thereof, such as Canada, Mexico, Japan, or other foreign locations. It is understood that the terms "first" and "second" should not be construed as corresponding to an order, rank, hierarchy, or weight, but instead are used for illustration purposes only. It is understood that the examples provided are for clarification purposes only and therefore should not be construed as limiting in any way.

When subscribers from a first domestic network attempt to place an IP call (e.g., through Voice over IP (VoIP), Voice over Long Term Evolution (VoLTE), etc.) via a calling device (CD) to a subscriber of a second domestic network, the first domestic network can rely on NPA information already stored within a system of the first domestic network to determine an IP address of a call receiving device (CRD) associated with the second domestic network. This is because the first domestic network and the second domestic network may be subject to and/or be associated with the same set of NPAs due to each domestic network operating in the same country. Thus, NPA information corresponding to a telephone number (i.e., a string conforming to an E.164 number standard format) that is assigned to the CRD of the second domestic network is already stored within the first domestic network. The NPA information for the CRD of the second domestic network can allow a domestic IP call session (i.e., an IP call session between the two domestic networks) to occur despite the respective devices being serviced by different domestic telecommunications carriers.

However, as countries from around the world modernize, an increasing number of foreign telecommunications carriers and foreign networks arise to service foreign subscribers (relative to subscribers of the domestic network). Conventionally, when a domestic network does not store NPA information (e.g., a Name Authority Pointer (NAPTR) record) within the domestic network, then the domestic network may conventionally not be able to determine whether the called number is associated with a carrier to which the call is typically routed (e.g., because the called telephone number may be ported) and the domestic network may not be able to verify that the CRD is an IP endpoint that can conduct the call session over an IP connection, thereby leaving open the possibility that the IP call request could be denied and the call may be routed using a non-IP connection, such as via a Public Switched Telephone Network (PTSN) or a cellular connection (e.g., a wireless connection conforming to 2G or 3G standards). Yet storing all NPA information for all NPAs across the globe may raise technical challenges that can strain compute and storage resource availability within a domestic network, as well as potentially cause added latency to set up foreign IP call sessions (i.e., IP calls between a domestic network and a foreign network). For example, one or more Canadian telecommunications networks may have a foreign network while a United States telecommunications carrier has a domestic network. The foreign network may provide service to thirty-nine NPAs assigned to Canada, where each Canadian NPA corresponds with roughly eight million telephone numbers, which in turn yields over three hundred million Canadian telephone numbers. Conventionally, each of the Canadian telephone numbers corresponds with a record, such as a NAPTR record, thereby yielding over three hundred million foreign NAPTR records. Given that other foreign countries may also correspond with hundreds of millions of foreign NAPTR records, the amount of data and associated memory size involved in storing foreign NAPTR records could involve thousands of terabytes, thereby burdening the domestic network. As such, the size and scale of the digital information can lead to technical challenges within the domestic network and slow computing resources that would otherwise have to replicate billions of NAPTR records within one or more systems on the domestic network. Because of the finite computing and storage resources available within the domestic network, the enormous amount of foreign NAPTR records could cause added latency due to searching billions of records. As such, some telecommunications carriers have delayed or avoided the implementation of servicing IP calls to foreign networks.

The present disclosure describes embodiments that can provide mechanisms for provisioning and enabling telephone number mapping so as to allow for routing of IP calls from a domestic network (e.g., an originating network) to a foreign network (e.g., a receiving network) without the domestic network having individual NAPTR records for NPAs and telephone numbers of the foreign network. As such, embodiments of the present disclosure can reduce latency and storage overhead, while also improving network routing efficiency, enhancing call quality, reducing latency, and creating additional network capacity for non-IP calls. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor based or programmable consumer electronics, distributed computing systems, minicomputers, mainframe computers, switches, and other particularized, non-generic machines.

Referring now to FIG. 1, aspects of a system 100 for various embodiments of the concepts and technologies disclosed herein for enabling internet protocol (IP) carrier peering to foreign network domains will be described, according to an illustrative embodiment. The system 100 shown in FIG. 1 includes an originating network 102, an internet protocol packet exchange (IPX) partner network 150, and a receiving network 170. It is understood that the IPX partner network 150 is optional, and may not be included in all embodiments of the system 100. In some embodiments, an "originating network" can be referred to as an "originating carrier network," and a "receiving network" can be referred to as a "receiving carrier network." The originating network 102 can include a telecommunications carrier network in which a call (e.g., an IP call) can be placed, initiated, and/or originated prior to traversal to another network. The receiving network 170 can include another telecommunications carrier network in which the call placed via the originating network 102 is received for connection to subscribers of the receiving network 170. It is understood that the originating network 102 can also be configured to receive calls, and the receiving network 170 can also be configured to place calls. Thus, the examples discussed herein are for illustration purposes only and should not be construed as limiting in any way. The system 100 may also include a calling party 126 (e.g., a user subscribing to the originating network 102), who can be associated with a calling device 128. The system 100 can include a called party 123 (e.g., a user subscribing to the receiving network 170), who can be associated with a call receiving device 125. The calling party 126 can use the calling device 128 to access various network services and content and to engage in various communications, such as electronic mail, IP calls, non-IP calls (e.g., voice and/or audio communications that use a non-IP network, such as a PTSN and/or cellular network), or any other type of calls, with subscribers of the originating network 102, with subscribers of the receiving network 170, and/or with subscribers of any other carrier operating other networks. The called party 123 can use the call receiving device 125 to make and/or accept one or more communications (e.g., IP calls, non-IP calls, and/or any other types of communications) from subscribers of the receiving network 170, the originating network 102, or any other network. Examples of an IP call can include a Voice over Long Term Evolution (VoLTE) call or a Voice over Internet Protocol (VoIP) call. The calling device 128 can include but should not be limited to a mobile communication device, a user equipment, a computer system, a laptop, a tablet device, a wearable device, any other type of computing device, or combinations thereof. The call receiving device 125 can include, but should not be limited to, a mobile communication device, a user equipment, a computer system, a laptop, a tablet device, a wearable device, any other type of computing device, or combinations thereof.

The originating network 102 can be configured to provide wireless and/or wireline communication links between devices and can include any number of servers, databases, network nodes, and/or other particular computer systems. In some embodiments, the originating network 102 can include, but should not be limited to, a cloud-computing network, an IP Multimedia Service (IMS) network, a Voice over IP (VoIP) network, a Voice over Long Term Evolution (VoLTE), a wireless network, an ethernet network, an evolved packet core (EPC) network, a satellite network, a broadband network, a cellular network, a private network, a cable network, an IP network, a virtual network, a circuit switched network, a Public Service Telephone Network (PTSN), or any combination thereof. In some embodiments, the receiving network 170 can include, but should not be limited to, a cloud-computing network, an IMS network, a VoIP network, a VoLTE network, a wireless network, an ethernet network, an EPC network, a satellite network, a broadband network, a cellular network, a private network, a cable network, an IP network, a virtual network, a circuit switched network, a PTSN, or any combination thereof. It is understood that the examples of the originating network 102 and the receiving network 170 are for illustration purposes only and therefore should not be construed as limiting in any way. It is understood that the originating network 102 is not limited to being associated only with devices that originate calls, but instead the originating network 102 can provide communication links for outgoing and incoming communications. Similarly, the receiving network 170 is not limited to being associated only with device that receive calls, but instead the receiving network 170 can provide communication links for outgoing and incoming communications. As such, the examples discussed herein are for illustration purposes only, and therefore should not be construed as limiting in any way.

In some embodiments, the originating network 102 can be a domestic network (which also may be referred to as a domestic carrier network that may be associated with a domestic carrier), and the receiving network 170 can be a foreign network (which also may be referred to as a foreign carrier network that may be associated with a foreign carrier), such as discussed above. The originating network 102 can include network components to facilitate communications and operations that allow for IP calls to the receiving network 170. For example, the originating network 102 can include at least one access point, such as the access point 104. The access point 104 can include a base transceiver station, an enhanced node B, a wireless access point, a provider edge device, a router, a customer edge device or other network access point configured to facilitate communications, such as communications between the calling device 128 and the originating network 102. The originating network 102 can include one or more session border controllers (SBCs), such as a session border controller 103 and a session border controller 106. In some embodiments, an SBC can configure a computer system of a network to perform specific functions, and thus be assigned a title accordingly. For example, in some embodiments, the SBC 103 can be an access-session border controller (A-SBC) due to placement at an edge of the originating network and interaction with the access point 104. In some embodiments, the SBC 106 can be an interconnect-session border controller (I-SBC) due to placement at an internetwork edge so as to connect and peer one network to another, such as the originating network 102 with the IPX-P network 150.

In some embodiments, the originating network 102 can be configured to include an evolved packet core network to provide LTE protocols and an IP Multimedia Subsystem (IMS) network to facilitate IP communications, such as an IP call session. For example, the originating network 102 can include a computer system of an IMS core 108 (hereinafter "IMS core"). The SBC 103 can be configured as an access route for communications from the calling device 128 to the IMS core 108. The IMS core 108 can include a computer system, a processor, a memory, a server, a network node, other physical and/or virtual hardware, firmware, and/or software, or combinations thereof to facilitate operations. The IMS core 108 can be configured to facilitate the connection of IP calls between domestic networks and foreign networks. For example, the IMS core 108 can include a processor 116, a memory 118, and computer executable instructions, such as modules, programs, routines, instances, or other particular instructions that configure the IMS core 108 as a particular, non-generic computer system. The IMS core 108 can include a Servicing-Call Session Control Function (S-CSCF) 112. The S-CSCF 112 can be configured to execute on the processor 116 of the IMS core 108 and provide operations for enabling IP carrier peering to foreign networks, such as in some embodiments, routing IP calls to the receiving network 170. Further discussion of the operations of the S-CSCF 112 will be discussed with respect to FIG. 4.

The IMS core 108 also can include one or more Breakout Gateway Control Functions (BGCF). As used herein, reference to a "BGCF" (e.g., the BGCF set 122) can provide operations that determine where breakout to a non-IP connection should occur (e.g., to a PSTN) and routing of IP calls, such as to an IP connection of a foreign network (e.g., the receiving network 170). In some embodiments, a set of BGCFs can be configured to conform to a tElephone NUmber Mapping (ENUM) standard (herein after "ENUM standard"). Conventionally, the ENUM standard allows for E.164 telephone number mapping to fixed domains that are identified via a uniform resource identifier, such as an ENUM query with a standard ENUM domain (e.g., "e164.arpa") and/or an intercarrier apex based domain (e.g., e164enum.net"). For example, the IMS core 108 can include a BGCF set 122 that is configured to conform to the ENUM standard so as to perform queries with the IPX-P network 150 and facilitate an IP call session to the receiving network 170. Unlike conventional BGCFs that only provide breakout to a non-IP connection (e.g., a PSTN), the BGCF set 122 can provide routing of IP calls and connections to a foreign network (e.g., the receiving network 170). In some embodiments, the IPX-P network 150 can use the Domain Name System (DNS) to facilitate routing from the originating network 102 to the receiving network 170. The BGCF set 122 can include a plurality of BGCF module instances that are stored in memory (e.g., the memory 118) and executed by a processor (e.g., the processor 116). The BGCF set 122 can be licensed and provisioned to conform to the ENUM standard, while also being configured to invoke a non-standard domain for ENUM querying operations, such as using a placeholder domain (e.g., "ipx.carrier.net") instead of defaulting to use of an intercarrier domain, as discussed in further detail below. In some embodiments, the S-CSCF 112 can invoke execution of the BGCF set 122 and/or a BGCF instance within the BGCF set 122. The BGCF set 122 can launch ENUM queries based on matching NPAs that correspond to a foreign carrier's network, such as in some embodiments, the receiving network 170.

In some embodiments, when a BGCF is licensed and configured to perform as an ENUM client, such as one of the BGCFs of the BGCF set 122, then the BGCF may be considered to operate as a Transit Function (TF), such as according to a 3GPP standard and/or another industry standard. As illustrated in FIG. 1, the IMS core 108 can include a transit function, such as the TF 114. Although illustrated as a separate module, it is understood that, in some embodiments, the TF 114 can be a BGCF that is a part of the BGCF set 122. In some embodiments, the IMS core 108 can invoke the Transit Function (TF) 114. It is understood that the TF 114 may not be invoked in every embodiment, and therefore the examples discussed herein should not be construed to limit the scope of the present disclosure. The TF 114 can be an ENUM client, such as the ENUM client 121 is ENUM-enabled and that conforms to Third Generation Partnership Project (3GPP) Standards. In some embodiments, the TF 114 can be configured to query a foreign carrier's ENUM server, such as a Tier 2 ENUM server 172. In some embodiments, the a BGCF of the BGCF set 122 can operate in as the TF 114 such that the BGCF set 122 can manage the invocation of functions and calls made by instructions of the TF 114. In some embodiments, the IMS core 108 also can include an unlicensed BGCF set (UL BGCF set) 124. The UL BGCF set 124 can include one or more BGCF instances that are not enabled to operate according to the ENUM standard. Thus, the BGCF set 122 includes a set of ENUM-enabled BGCFs, whereas the UL BGCF set 124 includes a set of non-ENUM-enabled BGCFs. In some embodiments, the IMS core 108 also can include an external domain table (EDT) 120. In some embodiments, the EDT 120 can be stored in the memory 118 of the IMS core 108. In other embodiments, the EDT 120 can be retrieved from a communicatively coupled data store of the origination network 102. It is understood that the examples discussed are provided for illustration purposes and therefore should not be construed as limiting in any way. The EDT 120 can be provisioned to point and/or map the IMS core 108 (e.g., using the S-CSCF 112) from a placeholder domain (e.g., the placeholder domain 142A of the NAPTR placeholder 142) to a placeholder BGCF fully qualified domain name (FQDN) (e.g., the placeholder BGCF FQDN 221).

The IMS core 108 can include a plurality of NPA identifiers corresponding to the receiving network 170. Each NPA can correspond with a unique NPA identifier. For example, the IMS core 108 can include foreign NPA identifiers ("foreign NPA IDs") 110. The foreign NPA IDs 110 can correspond to NPAs assigned to the receiving network 170. For example, the receiving network 170 can correspond with a foreign carrier (e.g., a telecommunications carrier in Canada). The foreign NPA IDs 110 can correspond with, for example, thirty-nine NPAs that are allowed for use for the foreign carrier. In some embodiments, each of the foreign NPA IDs 110 can be associated with an NPA zone file record, such as one of a plurality of NPA zone file records (NPA ZFR) 138. Put simply, each NPA ZFR 138 can correspond with one foreign NPA ID 110. It is understood that, in various embodiments, an NPA can correspond with any portion of the called telephone number, such as, but not limited to, a country calling code, a country code plus destination code, all or part of a national number with or without the leading country code (e.g., the first three digits of a E.164 telephone number (e.g., NPA-XXX-XXXX)), an international dialing prefix, or a combination thereof. The IMS core 108 also can include a plurality of domestic NPA identifiers (domestic NPA IDs) 111 that correspond to NPAs of a domestic network, such as the originating network 102. The NPAs associated with the domestic NPA IDs 111 do not correspond with NPAs associated with the foreign NPA IDs 110. Thus, the domestic NPA IDs 111 correspond with domestic NPA zone file records (not shown) while the foreign NPA IDs 110 correspond with the NPA zone file records (NPA ZFRs) 138.

The IMS core 108 can be configured to facilitate the enablement and provisioning of a private enabled telephone number mapping server 130 (hereinafter "private enabled ENUM server"). The private enabled ENUM server 130 can be communicatively coupled to the IMS core 108 via a communication path 1. The private enabled ENUM server 130 can include a processor 132 and a memory 134 that is configured upon execution of instructions. The private enabled ENUM server 130 can be configured to store the plurality of NPA ZFRs 138 that are associated with the foreign NPA IDs 110. The NPA ZFRs 138 can be stored in the memory 134 and/or a communicatively coupled datastore of the originating network 102. The private enabled ENUM server 130 may be accessible only by devices within the originating network 102 (e.g., the IMS core 108), and thus the private enabled ENUM server 130 may be considered private to the originating network 102. In some embodiments, the S-CSCF 112 can access the NPA ZFRs 138 based on the foreign NPA IDs 110. For example, one of the foreign NPA IDs 110 can include digits "123" for a province in Canada. The S-CSCF 112 can identify one of the NPA ZFRs 138 that corresponds to the digits "123" for the Canadian province. In some embodiments, the private enabled ENUM server 130 can include a foreign NAPTR record, such as one or more foreign NAPTR records 173A, for telephone numbers corresponding to each foreign NPA ID 110. The foreign NAPTR records 173A can be duplicates of and/or substantially similar to a plurality of foreign NAPTR records 173 stored in the Tier 2 ENUM server 172 of the receiving network 170.

Conventionally, when the private enabled ENUM server 130 receives an ENUM query (e.g., the private ENUM query 200), the private enabled ENUM server 130 may look for a foreign NAPTR record that corresponds to a telephone number (or reverse telephone number) included in the ENUM query. If a foreign NAPTR record is not found (due to never existing within the memory 134 of the private enabled ENUM server 130 or being deleted from the memory 134), then the private enabled ENUM server 130 may respond to the ENUM query with a Record Not Found (RNF) message 136, which conventionally could and/or would direct a call request to use a non-IP connection (e.g., 2G or PSTN). Conventionally, the IMS core 108 may attempt to use the telephone number provided by the IP call request to setup a call, but would not be able to verify that an IP-based call would occur because the telephone number may be ported and/or associated with a call receiving device that cannot engage in IP calls. However, the private enabled ENUM server 130 can be provisioned to avoid returning the RNF message 136 when a foreign NAPTR record (e.g., one of the foreign NAPTR records 173A) is not present within the memory 134 of the private enabled ENUM server 130, and instead continue set up of an IP-based call to occur. This can be accomplished by the creation of a name authority pointer record placeholder (NAPTR placeholder) 142. In some embodiments, the private enabled ENUM server 130 can receive a command to create a single instance of the NAPTR placeholder 142. The NAPTR placeholder 142 can take the place of all foreign NAPTR records 173A that are stored, or would otherwise be stored, in the private enabled ENUM server 130. Once the private enabled ENUM server 130 creates the single instance of the NAPTR placeholder 142, the one or more foreign NAPTR records 173A can be removed (i.e., deleted) from memory, thereby decreasing memory utilization and increasing processing efficiency for the private enabled ENUM server 130.

In some embodiments, an instance of the NAPTR placeholder 142 may be created without any corresponding foreign NAPTR records 173A existing in the private enabled ENUM server 130. In other embodiments, one or more foreign NAPTR records 173A may exist within the private enabled ENUM server 130 prior to the creation of the single instance of the NAPTR placeholder 142. In some embodiments, if the NAPTR placeholder 142 has been created but one or more foreign NAPTR records 173A still exist within the memory of the private enabled ENUM server 130, then the private enabled ENUM server 130 can safely remove, from within each of the plurality of the NPA ZFRs 138, some or all foreign NAPTR records 173A stored therein. If the private enabled ENUM server 130 determines that one or more foreign NAPTR records 173A exist within the private enabled ENUM server 130 and the NAPTR placeholder 142 has not yet been created, then the private enabled ENUM server 130, in some embodiments, may first create the NAPTR placeholder 142 and then delete the foreign NAPTR records 173A. In other embodiments, the private enabled ENUM server 130 can remove the foreign NAPTR records 173A prior to the creation of the single instance of the NAPTR placeholder 142. In an embodiment, if a private ENUM query 200 is received prior to the creation of the NAPTR placeholder 142 (and/or the private enabled ENUM server 130 does not have a corresponding foreign NAPTR record 173A stored in the memory 134), the private enabled ENUM server 130 can create the single instance of the NAPTR placeholder 142 to use in responding to the private ENUM query instead of responding with the RNF message 136. Once the private enabled ENUM server 130 creates the NAPTR placeholder 142, the private enabled ENUM server 130 may avoid returning the RNF message 136 because the NAPTR placeholder 142 can be used in place of the foreign NAPTR records 173A. Thus, the NAPTR placeholder 142 can instruct the private enabled ENUM server 130 to avoid sending the RNF message 136 and instead instruct the IMS core 108 to access the EDT 120.

Although the foreign NAPTR record corresponding to the telephone number (or reverse telephone number) provided in the private ENUM query 200 may not exist within the memory 134 of the private enabled ENUM server 130, the single instance of the NAPTR placeholder 142 can instruct the private enabled ENUM server 130 to generate a unique ENUM response message 206 in response to receiving a private ENUM query 200. The private ENUM query 200 can provide a telephone number 128A (or variant thereof, such as the telephone number 128A in reverse order) to use to place an IP call to the receiving carrier network 170. The NAPTR placeholder 142 can include a placeholder domain 142A, which will be discussed in further detail with respect to FIG. 2B. The placeholder domain 142A can be appended to the telephone number 128A to form a dynamic session internet protocol uniform resource identifier, which is included in the unique ENUM response message 206. Further aspects of the private ENUM query 200, the NAPTR placeholder 142, and the unique ENUM response message 206 will be discussed below with respect to FIGS. 2A-2C.

The calling party 126 can use the calling device 128 to place an IP call request 129, via input of the telephone number 128A, to the call receiving device 125 associated with the called party 123. The access point 104 and the SBC 103 can relay the IP call request 129 to the IMS core 108. The S-CSCF 112 can generate the private ENUM query 200 based on the IP call request 129, and send the private ENUM query 200 to the private enabled ENUM server 130. The called telephone number 128A is associated with the CRD 125, and the called telephone number 128A may be initially provided in the IP call request 129. The private ENUM query 200 can include the called telephone number 128A (or variant thereof, such as the called telephone number 128A in reverse order) that corresponds with a foreign NPA ID 110. The telephone number 128A can conform to the E.164 standard, as known by one of ordinary skill in technology. The private enabled ENUM server 130 may not have a foreign NAPTR corresponding to the telephone number 128A stored in the memory 134, or any other data store of the originating network 102. However, because the private enabled ENUM server 130 has been provisioned and enabled with the NAPTR placeholder 142, the NAPTR placeholder 142 can be used by the private enabled ENUM server 130 to match the called telephone number 128A from the private ENUM query 200 and create the unique ENUM response message 206. Thus, the unique ENUM response message 206 can direct the S-CSCF 112 to query the EDT 120 in order to further facilitate establishment of an IP call session 224. In some embodiments, the unique ENUM response message 206 can be provided instead of responding with an RNF message 136. Conventionally, when an RNF message 136 is given to the IMS core 108, the IMS core 108 may attempt to fulfill the IP call request 129 by using only the called telephone number 128A provided; however, the IMS core 108 may not be able to determine whether the called telephone number 128A is being ported and/or is associated with a device that can support an IP call session, which in turn may cause the request to be completed using a non-IP call session (e.g., via a cellular network or a PTSN network). In some embodiments, the unique ENUM response message 206 can be provided instead of the IMS core 108 relying on the receiving network 170 to complete the call without verification as to whether the CRD 125 can receive an IP call session or is limited to receiving calls that are non-IP connections.

In some embodiments, the originating network 102 can include a local DNS server, such as the DNS server 160. As illustrated in FIG. 1, the DNS server 160 is communicative coupled with the IMS core 108 and separate from the IMS core 108. It is understood that, in some embodiments, the DNS server 160 may reside within the IMS core 108. As such, the examples provided are for illustration only and should not be construed as limiting in any way. In some embodiments, the DNS server 160 can include a processor 162 and a memory 164. The DNS server 160 can include DNS records for use in converting received information into IP addresses. For example, in some embodiments, the DNS server 160 can include a BGCF set of IP addresses for the BGCF set 122 (hereinafter referred to as "BGCF set IPs 166"). The BGCF set IPs 166 that identify one or more internet protocol addresses corresponding to the BGCF set 122 of the IMS core 108. In some embodiments, the S-CSCF 112 can receive the unique ENUM response message 206 that directs the S-CSCF 112 to the EDT 120. In turn, the EDT 120 can provide a placeholder BGCF FQDN to the S-CSCF 112. The S-CSCF 112 can prepare a BGCF query request 210 that includes the placeholder BGCF FQDN. In some embodiments, the placeholder BGCF FQDN can include a specific IPX domain for the BGCF, such as "@ipxbgcf.carrier.net," however this may not always be the case. It is understood that the example provided is for illustration purposes and should not be construed as limiting in any way. The BGCF query request 210 can be sent to the DNS server 160 via communication path 2. The DNS server 160 can resolve the BGCF FQDN to a correct IP address of the BGCF set 122 so that the BGCF set 122 can, in some embodiments, query the Tier 1 ENUM server 152 (e.g., by initiating a Tier 1 ENUM request, such as the revised ENUM query 214). Thus, based on the placeholder BGCF FQDN 221 included in the BGCF query request 210, the DNS server 160 can pull the BGCF set IPs 166 from the memory 164 and prepare a BGCF query response 212 with the BGCF set IP(s) 166 included therein. The BGCF query response 212 can be sent back to the S-CSCF 112 of the IMS core 108 in order for the S-CSCF 112 to identify the BGCF set 122 that should be used to query the Tier 1 ENUM server 152.

The IPX-P network 150 can be configured to link each of the devices and/or networks in the system 100 to one another, and may include any of the functionality of an internetwork packet exchange network. The IPX-P network 150 may be a partner network of a carrier network (e.g., the originating network 102 and/or the receiving network 170). Additionally, the IPX-P network 150 may be configured to transmit, generate, and receive any information and data traversing the system 100. In some implementations, the IPX-P network 150 may include any number of servers, databases, or other network componentry. The IPX-P network 150 may also include and/or be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any other network, or any combination thereof, as illustrative, non-limiting examples. In some implementations, the IPX-P network 150 can be part of a single autonomous system that is located in a particular geographic region, or be part of multiple autonomous systems that span several geographic regions. It is understood that the IPX-P network 150 can be optional such that a Tier 1 ENUM server 152 may not necessarily be hosted by the IPX-P network 150. Instead, the Tier 1 ENUM server 152 can be hosted by any network (irrespective of whether the network hosting the Tier 1 ENUM server 152 is associated with the originating network 102 or the receiving network 170). For example, in some embodiments, the Tier 1 ENUM server 152 may be hosted by a carrier not associated with the originating network 102 and/or the receiving network 170, such as an independent ENUM provider. In the embodiment illustrated in FIG. 1, the Tier 1 ENUM server 152 is hosted by the IPX-P network 150, however this may not always be the case in all embodiments.

In some embodiments, the IPX-P network 150 can include one or more session border controllers (SBCs) (e.g., an SBC 151 and an SBC 153) and an IPX Tier 1 ENUM server ("Tier 1 ENUM server") 152. As discussed below in further detail, in some embodiments, the communication path 5 that carrier the IP call session 224 (which is discussed in further detail below) may flow through the IPX-P network 150 using the SBC 151 and/or the SBC 153; however, this may not be the case in all embodiments. In some embodiments, the communication path 5 does not traverse the IPX-P network 150 (and thus may not pass through one or more of the SBC 151 and/or the SBC 153). Similarly, in some embodiments, the communication path 4 that carries the Tier 2 ENUM server request 220 may traverse through the IPX-P network 150, however this may not be the case in all embodiments. In some embodiments, the communication path 4 that carries the Tier 2 ENUM server request 220 may not traverse through the IPX-P network 150. In some embodiments, the IPX-P network 150 can include an IPX domain name system (DNS) server 160'. In some embodiments, the IPX-P network 150 can utilize the SBC 151 and the SBC 153 to exert control over signaling associated with communications, such as the IP call session 224, traversing through the IPX-P network 150, and may include any functionality associated with a session border controller.

In some embodiments, the IPX Tier 1 ENUM server 152 can be referred to as a "Tier 1" ENUM server. As used herein, reference to the phrases "Tier 0," "Tier 1," and/or "Tier 2" correspond with a multi-tier logical hierarchy set forth by the Groupe Speciale Mobile Association (GSMA), such as in the GSMA NG.105 ENUM Guidelines. The Tier 0 level is authoritative for the ENUM top level domain and can include pointers to Tier 1 authoritative servers. The Tier 1 level can be a country code level that is authoritative for servers of telecommunication providers that are assigned E.164 country codes and can include pointers to Tier 2 authoritative servers. The Tier 2 level can be a service provider level and be authoritative for national destination codes and individual subscriber numbers, where the individual subscriber numbers can be associated with one or more NAPTR record. As such, in some embodiments, the ENUM server 152 can function at the Tier 0 level (and thus, in some embodiments, can operate as a Tier 0 ENUM server) because the ENUM server 152 may be authoritative for both the ENUM top level domain as well as being authoritative for all assigned E.164 country codes that correspond and/or are opted into by international telecommunication carriers/providers. In some embodiments, the ENUM server 152 can function at the Tier 1 level (and thus can operate as a Tier 1 ENUM server) because the Tier 1 ENUM server 152 may be authoritative for only one or more assigned E.164 country code(s) (e.g., Country Code 1 for US, Canada, and Puerto Rico, etc.) and therefore function as the Tier 1 level. In some embodiments, the Tier 1 ENUM server 152 can change functionality so as to operate according to at least one of a Tier 1 level, a Tier 0 level, or a combination thereof. It is understood that the examples discussed above are for illustration purposes only, and therefore should not be construed as limiting the scope of the disclosure in any way.

The IPX Tier 1 ENUM server 152 can include a processor 154 and a memory 156. The IPX Tier 1 ENUM server 152 may store name server records including information and IP addresses for a Tier 2 ENUM server of networks that are partnered with the IPX-P network 150. In some embodiments, the IPX Tier 1 ENUM server 152 may include IP address information and pointers to the Tier 2 ENUM server 172 of the receiving network 170. In some implementations, the IPX Tier 1 ENUM server 152 may store name server records and pointers for other types of ENUMs and/or for any type of devices in other partner networks. In some embodiments, the IPX Tier 1 ENUM server 152 can include a name server record that points to the Tier 2 ENUM server 172, such as a Tier 2 ENUM server Fully Qualified Domain Name (FQDN) Name Server Record (NSR) 158 (hereinafter "Tier 2 ENUM server FQDN NSR 158"). In some embodiments, the IPX Tier 1 ENUM server 152 can receive a revised ENUM query 214 from the IMS core 108 (e.g., using the S-CSCF 112 and/or the BGCFs 122) via a communication path 3, where the revised ENUM query 214 can trigger the IPX Tier 1 ENUM server 152 to prepare an IPX Tier 1 ENUM response 218. In some embodiments, the revised ENUM query 214 can be referred to as a Tier 1 ENUM query. The IPX Tier 1 ENUM response 218 can include the Tier 2 ENUM server FQDN NSR 158 that points to the Tier 2 ENUM server 172. The IPX Tier 1 ENUM response 218 can be sent back to the IMS core 108 (e.g., to the S-CSCF 112 and/or the BGCFs 122) via the communication path 3. The Tier 2 ENUM server FQDN NSR 158 can be used to route and/or connect with the Tier 2 ENUM server 172 via the Tier 2 ENUM request 220. Put differently, the Tier 2 ENUM request 220 can use the Tier 2 ENUM server FQDN NSR 158 to determine where to send the Tier 2 ENUM request 220. The IPX DNS server 160' may function as a backup for the DNS server 160 such that if the DNS server 160 fails to locally resolve a Tier 2 ENUM server FQDN 158A, then the IMS core 108 may reach out to the IPX DNS server 160' to assist in resolving for the Tier 2 ENUM server FQDN 158A. For example, if the IPX T1 ENUM response 218 (which is discussed below) does not include DNS resource records (e.g., a DNS address record, such as A/AAAA/SOA, etc.) then the IPX DNS server 160' may assist in resolving a Tier 2 server FQDN 158A. It is understood that the examples discussed above are for illustration purposes only, and therefore should not be construed as limiting in any way.

In an embodiment, the Tier 2 ENUM request 220 may be sent from the IMS core 108 to the Tier 2 ENUM server 172 via communication path 4. In other embodiments, the Tier 1 ENUM server 152 can be used to resolve the foreign NAPTR record 173 by querying the Tier 2 ENUM server 172 on behalf of the originating network 102. For example, in some embodiments, in response to the Tier 1 ENUM server 152 receiving the revised ENUM query 214, the T1 ENUM server 152 may obtain the Tier 2 ENUM server FQDN NSR 158 and prepare a Tier 2 ENUM query (e.g., the Tier 2 ENUM request 220) that can include information that is substantially similar to the revised ENUM query 214. The Tier 1 ENUM server 152 may send the Tier 2 ENUM request 220 along the communication path 4A to the Tier 2 ENUM server 172. The Tier 2 ENUM server 172 can return a foreign NAPTR response 222 to the IPX-P network 150, which in turn can pass the foreign NAPTR response 222 back to the originating carrier network 102 (which in some embodiments may occur with and/or in the IPX Tier 1 ENUM response 218). In some embodiments, the foreign NAPTR response 222 can be referred to as a Tier 2 ENUM response. In this case where the communication path 4A is used, the Tier 2 ENUM request 220 is not sent via the communication path 4 and the foreign NAPTR response 222 does not occur via the communication path 4 because, in this example, the IPX Tier 1 ENUM server 152 is resolving (on behalf of the IMS core 108 of the originating network 102) the foreign NAPTR record 173 using the communication path 4A via the Tier 2 ENUM server 172. In this embodiment, the IMS core 108 would not query the Tier 2 ENUM server 172 to obtain the foreign NAPTR record 173 directly from the receiving network 170 (e.g., via the communication path 4) because the Tier 1 ENUM server 152 would be querying the Tier 2 ENUM server 172 on behalf of the originating network 102 (e.g., via the communication path 4A).

The receiving network 170 can be configured to link one, more than one, and/or each of the devices in the system 100 to one another in order to facilitate connection of the IP call session 224 with the call receiving device 125. The receiving network 170 can include an access point 176, such as an enhanced node B, that can be used to communicatively couple the receiving network 170 to the call receiving device 125. The receiving network 170 also can include a SBC 174 that can connect and/or peer with the SBC 153 of the IPX-P network 150 via a connection path (not shown) or the receiving network SBC 174 can connect and/or peer directly with the originating network SBC 106, such as via the communication path 5. For example, the receiving network 170 can be a foreign carrier network that is associated with one or more of the foreign NPA IDs 110 stored in the IMS core 108. The receiving network 170 can include the Tier 2 ENUM server 172 that can utilize DNS records to translate telephone numbers into a URI and/or IP address that can be used in IP-based communications, such as for the IP call session 224. The Tier 2 ENUM server 172 can include a processor 175 and a memory 177. The memory 177 can store a plurality of foreign NAPTR records, such as the plurality of foreign NAPTR records 173, that correspond with the foreign NPA IDs 110 stored in the IMS core 108. Each telephone number associated with a call receiving device of a foreign network will be associated with a particular foreign NPA ID 110 and a foreign NAPTR record 173. A such, each foreign NAPTR record 173 is associated with a telephone number that, in turn, is associated with a particular foreign NPA ID 110. The Tier 2 ENUM server 172 can receive a Tier 2 ENUM request, such as the Tier 2 ENUM request 220, that can contain a version of the telephone number 128A associated with the call receiving device 125 (e.g., the telephone number 128A in reverse order). In some embodiments, the Tier 2 ENUM request 220 is received along communication path 4A from the Tier 1 ENUM server 152. The Tier 2 ENUM server 172 can find an entry corresponding to the telephone number 128A provided in the Tier 2 ENUM request 220, and in response, provide a foreign NAPTR response 222 that can include one of the foreign NAPTR records 173 and information about the SBC 174, which is the preferred network node through which the IP call session 224 should be routed to connect to the call receiving device 125 via the communication path 5. If the Tier 1 ENUM server was used to resolve the foreign NAPTR record(s) 173 by sending the Tier 2 ENUM request 220 to the Tier 2 ENUM server 172, then the Tier 2 ENUM server 172 may respond with the foreign NAPTPR response 222 being sent to the Tier 1 ENUM server 152 along the communication path 4A. In turn, the Tier 1 ENUM server 152 can forward the foreign NAPTR response 222 along the communication path 3 to the IMS core 108, which in turn can conduct the IP call session 224 along the communication path 5. It is understood that in some embodiments, the communication path 5 may avoid traversing the IPX-P network 150. In other embodiments, the communication path 5 may traverse through the IPX-P network 150. The SBC 174 of the receiving network 170 may allow the IP call session 224 to proceed to the CRD 125 based on IMS core 108 using information from the foreign NAPTR response 222.

Turning now to FIGS. 2A-2J with continued reference to FIG. 1, aspects of various messages for enabling internet protocol peering to a foreign network are illustrated. FIG. 2A illustrates an embodiment of the private ENUM query 200 that can be sent by the IMS core 108 to the private enabled ENUM server 130. The private ENUM query 200 can include a reverse telephone number 204 and a standard domain 202. The reverse telephone number 204 can be the telephone number 128A associated with the call receiving device 125 in reverse order (e.g., if the telephone number is "14168881234," then the reverse telephone number can be "4.3.2.1.8.8.8.6.1.4.1"). The reverse telephone number 204 can be followed in sequence with the standard domain 202. In some embodiments, the standard domain 202 can be an apex-based domain, such as "e164.arpa." The private ENUM query 200 can be based on the IP call request 129 that is received from the calling device 128. In some embodiments, the private ENUM query 200 can be generated by the S-CSCF 112 of the IMS core 108. Thus, in some embodiments, any telephone number that is called will be appended as "<reverse TN>.standard domain" and sent in the private ENUM query 200. Conventionally, if a NAPTR record exists within the private enabled ENUM server 130, then an IP call session can proceed by using the conventional NAPTR record in response to the private ENUM query.

However, if the telephone number of a private ENUM query corresponds with one of the foreign NPA IDs 110, then the private enabled ENUM server 130 may determine whether a NAPTR placeholder, such as the NAPTR placeholder 142, has been created.

As discussed above, in some embodiments, the private enabled ENUM server 130 will not find a foreign NAPTR record corresponding to the telephone number 128A stored in the memory 134. In some embodiments, this is because the private enabled ENUM server 130 may have deleted one or more of the foreign NAPTR records 173A corresponding to the telephone number 128A that happened to be stored in the memory 134. Alternatively, the private enabled ENUM server 130 (or other device of the originating network 102) may have never stored the foreign NAPTR records 173A corresponding to at least one of the foreign NPA IDs 110 for which the telephone number 128A corresponds. In some embodiments, the private enabled ENUM server 130 can utilize the NAPTR placeholder 142 instead of denying the IP call and/or instead of attempting an IP call without verification of routing to a call receiving device that supports an IP call. FIG. 2B illustrates an embodiment of the NAPTR placeholder 142. The NAPTR placeholder 142 can include a placeholder domain 142A. The NAPTR placeholder 142 can be used to facilitate a process of converting the telephone number 128A to an intercarrier domain (e.g., e164enum.net). However, the private enabled ENUM server 130 may first extract the telephone number 128A from the private ENUM query 200 so as to bypass the standard domain 202 and replace the standard domain 202 with the placeholder domain 142A. An example of the placeholder domain 142A can include "@ipx.carrier.net." It is understood that the example is provided for illustration purposes only, and therefore should not be construed as limiting in any way. The placeholder domain 142A can allow the S-CSCF 112 of the IMS core 108 to call on the EDT 120 to map the placeholder domain 142A to a placeholder BGCF FQDN 221 that is associated with the BGCF set 122 that includes ENUM-enabled BGCFs. Stated differently, the NAPTR placeholder 142 can cause the creation of the unique ENUM response message 206, thereby allowing the IMS core 108 to map the NAPTR placeholder 142 to the BGCF set 122 via the EDT 120, and in turn, trigger the IPX Tier 1 ENUM server 152 to be queried (e.g., using the revised ENUM query 214). In some embodiments, the revised ENUM query 214 can be referred to as a Tier 1 ENUM query.

FIG. 2C illustrates an embodiment of a unique ENUM response message, such as the unique ENUM response message 206, that can be sent to the IMS core 108 in response to the private ENUM query 200 being received by the private enabled ENUM server 130. Using an instance of the NAPTR placeholder 142, the private enabled ENUM server 130 can create the unique ENUM response message 206 based on the private ENUM query 200 and the reverse telephone number 204 included therein. The unique ENUM response message 206 can include the telephone number 128A (corresponding to the reverse telephone number 204) prepended to the placeholder domain 142A so as to create a dynamic session internet protocol uniform resource indicator (dynamic SIP URI) 208. The dynamic SIP URI 208 can be used by the S-CSCF 112 of the IMS core 108 to determine that the IP call request 129 pertains to a foreign NPA, and therefore the call setup should be further analyzed by consulting the EDT 120.

FIG. 2D illustrates an embodiment of the external domain table (EDT) 120 that can be accessed by the S-CSCF 112 of the IMS core 108. In some embodiments, the EDT 120 is resident on a memory of the originating network 102, however this may not always be the case. The EDT 120 can be provisioned to point from the placeholder domain 142A to a placeholder BGCF FQDN 221. An example of the placeholder BGCF FQDN 221 can include "@ipxbgacarrier.net." It is understood that the example is provided for illustration purposes only, and therefore should not be construed as limiting in any way. The S-CSCF 112 can receive the unique ENUM response message 206 and determine that the dynamic SIP URI 208 includes the placeholder domain 142A. In turn, the S-CSCF 112 can access the EDT 120 and determine that the placeholder domain 142A maps to the placeholder BGCF FQDN 221. The placeholder BGCF FQDN 221 can be dereferenced to represent the ENUM-enabled set of BGCFs 122.

FIG. 2E illustrates an embodiment of a BGCF query request, such as the BGCF query request 210. The BGCF query request 210 can be generated by the S-CSCF 112 in response to receiving the unique ENUM response message 206 and analyzing the EDT 120. The BGCF query request 210 can include the placeholder BGCF FQDN 221 indicated in the EDT 120. The BGCF query request 210 can be sent to the DNS server 160 so that the DNS server 160 can resolve the placeholder BGCF FQDN 221 with IP addresses that correspond to a limited set of ENUM-enabled BGCFs (e.g., one or more BGCFs of the BGCF set 122). The BGCF query request 210 can be sent to the DNS server 160 via communication path 2.

FIG. 2F illustrates an embodiment of a BGCF query response, such as the BGCF query response 212. The BGCF query response 212 can be sent by the DNS server 160 to the S-CSCF 112 of the IMS core 108 in response to receiving the BGCF query request 210. The DNS server 160 can extract the placeholder BGCF FQDN 221 from the BGCF query request 210 and determine that the placeholder BGCF FQDN 221 corresponds with IP addresses for the BGCF set 122. The DNS server 160 can be configured to pull IP addresses corresponding to the BGCF set 122, such as one or more of the BGCF set IPs 166. The DNS server 160 can prepare the BGCF query response 212 that includes one or more of the BGCF set IPs 166 corresponding to the BGCF set 122. The DNS server 160 replies to the BGCF query request 210 by sending the BGCF query response 212 to the S-CSCF 112 via the communication path 2. The S-CSCF 112 can receive the BGCF query response 212, identify the BGCF set 122, and activate one or more BGCF of the BGCF set 122 based on the BGCF set IPs 166 of the BGCF query response 212, to further facilitate routing and peering with the receiving network 170.

FIG. 2G illustrates an embodiment of a revised ENUM query, such as the revised ENUM query 214. The revised ENUM query 214 can be created and sent by one or more BGCF of the BGCF set 122 activated by the S-CSCF 112. At least one BGCF from the BGCF set 122 can obtain the reverse telephone number 204 that was included in the private ENUM query 200 sent by the S-CSCF 112. The BGCF of the BGCF set 122 can append an intercarrier domain 216 to the reverse telephone number 204 so as to create the revised ENUM query 214. In some embodiments, the intercarrier domain 216 can be used for any of the telephone numbers or reverse telephone numbers corresponding to the foreign NPA IDs 110. The intercarrier domain 216 can be recognized by the IPX Tier 1 ENUM server 152 in order to identify a Tier 2 ENUM server FQDN NSR, such as the Tier 2 ENUM server FQDN NSR 158, corresponding to the Tier 2 ENUM server 172. An example of the intercarrier domain 216 can include "e164enum.net." It is understood that the example is provided for illustration purposes only, and therefore should not be construed as limiting in any way. Thus, conventionally the private enabled ENUM server 130 would have relied on a foreign NAPTR to reply to the private ENUM query 200 for routing to the intercarrier domain 216, and if such a foreign NAPTR did not exist, the private enabled ENUM server 130 would have returned an RNF message, such as the RNF message 136. However, the private enabled ENUM server 130 has been configured, provisioned, or otherwise enabled to use the placeholder domain 142A to bypass the standard domain 202 and activate a BGCF of the BGCF set 122 that ultimately obtains routing information from the Tier 2 ENUM server 172 despite a foreign NAPTR (that would otherwise correspond with the called telephone number 128A) not existing within the private enabled ENUM server 130. The revised ENUM query 214 can be sent to the IPX Tier 1 ENUM server 152 via the communication path 3. In some embodiments, the BGCF of the BGCF set 122 can implement instructions and/or routines of the Transit Function 114 when creating the revised ENUM query 214 and/or communicating with the IPX Tier 1 ENUM server 152.

FIG. 2H illustrates an embodiment of an IPX Tier 1 ENUM response, such as the IPX Tier 1 ENUM response 218, created by the IPX Tier 1 ENUM server 152 in response to the revised ENUM query 214. The IPX Tier 1 ENUM response 218 can be created based on the reverse telephone number 204 included in the revised ENUM query 214, such as illustrated in FIG. 2H. The IPX Tier 1 ENUM response 218 can include the Tier 2 ENUM server FQDN NSR 158. The Tier 2 ENUM server FQDN NSR 158 can identify a Fully Qualified Domain Name of the Tier 2 ENUM server 172, such as the Tier 2 ENUM Server FQDN 158A. The Tier 2 ENUM server FQDN 158A can be utilized by the BGCF of the BGCF set 122 to route information to the Tier 2 ENUM server 172. The IPX Tier 1 ENUM response 218 can be created based on the reverse telephone number included in the revised ENUM query 214, such as illustrated in FIG. 2H. It is understood that the example is provided for illustration purposes only, and therefore should not be construed as limiting in any way. The Tier 2 ENUM server FQDN NSR 158 can be part of resolving routing information for the Tier 2 ENUM server 172. The IPX Tier 1 ENUM response 218 can be sent to the BGCF of the BGCF set 122 via the communication path 3.

FIG. 2I illustrates an embodiment of a Tier 2 ENUM request, such as the Tier 2 ENUM request 220. The Tier 2 ENUM request 220 may not be a conventional ENUM request because the Tier 2 ENUM request 220 may implement the intercarrier domain 216. In some embodiments, the Tier 2 ENUM request 220 can be referred to as a foreign NAPTR request. The Tier 2 ENUM request 220 can be sent from one or more BGCF of the BGCF set 122 in response to the IPX Tier 1 ENUM response 218. In some embodiments, the BGCF set 122 can be used in the creation of the Tier 2 ENUM request 220 and interaction with the Tier 2 ENUM server 172. In some embodiments, the Tier 2 ENUM request 220 can include information that is substantially similar to the revised ENUM query 214. The Tier 2 ENUM request 220 can be based on the Tier 2 ENUM server FQDN NSR 158 that was received in the IPX Tier 1 ENUM response 218. In some embodiments, the Tier 2 ENUM server FQDN NSR 158 can be included in the Tier 2 ENUM request 220 so as to direct the Tier 2 ENUM server 172 to provide the foreign NAPTR that corresponds with the telephone number 128A provided by the calling device 128 that corresponds with the reverse telephone number 204 included in the Tier 2 ENUM request 220. The Tier 2 ENUM request 220 can be sent to the Tier 2 ENUM server 172 via the communication path 4 and/or the communication path 4A, which can (but is not required to) pass through the IPX-P network 150, of via the communication path 4A through the use of the Tier 1 ENUM server 152, as discussed above.

FIG. 2J illustrates an embodiment of a foreign NAPTR response, such as the foreign NAPTR response 222. The Tier 2 ENUM server 172 can receive the Tier 2 ENUM request 220 and identify a foreign NAPTR 226 that corresponds with the telephone number 128A that was called by the calling device 128. In some embodiments, the Tier 2 ENUM server 172 can identify the foreign NAPTR 226 based on the Tier 2 ENUM server FQDN NSR 158, the reverse telephone number 204, and/or the intercarrier domain 216 included in the Tier 2 ENUM request 220. The foreign NAPTR 226 can have a Naming Plan Area identifier that is among the foreign NPA IDs 110 stored in the IMS core 108. In some embodiments, the foreign NAPTR response 222 can include an identifier of the SBC 174 where the receiving network 170 would prefer to route the IP call session 224 to the call receiving device 125 via the communication path 5. The foreign NAPTR response 222 can be sent by the Tier 2 ENUM server 172 to the one or more BGCF of the BGCF set 122 via the communication path 4. Using the foreign NAPTR response 222, one or more BGCF of the BGCF set 122 can route the IP call session 224 from the SBC 106 of the originating network 102 to the SBC 151, which in turn forwards the IP call session 224 to the SBC 153 of the IPX-P network 150. The SBC 153 extends the IP call session 224 to the SBC 174 as indicated by the foreign NAPTR response 222 and/or the foreign NAPTR 226 included therein. Alternatively, the IP call session 224 can be established directly between originating network 102 and terminating network 170 without the use of IPX-P network 150 SBCs 151 and 153. Using the foreign NAPTR response 222, one or more BGCF of the BGCF set 122 can route the IP call session 224 from the SBC 106 of the originating network 102 to the SBC 174 of the terminating network 170 as indicated by the foreign NAPTR response 222 and/or the foreign NAPTR 226 included therein. The foreign NAPTR 226 can be one of the plurality of foreign NAPTR records 173 stored on the receiving network 170. The SBC 174 can identify the access point 176 that communicatively couples the call receiving device 125 to the receiving network 170. The called party 123 can use the call receiving device 125 to accept the IP call and engage in the IP call session 224.

Figure 3:
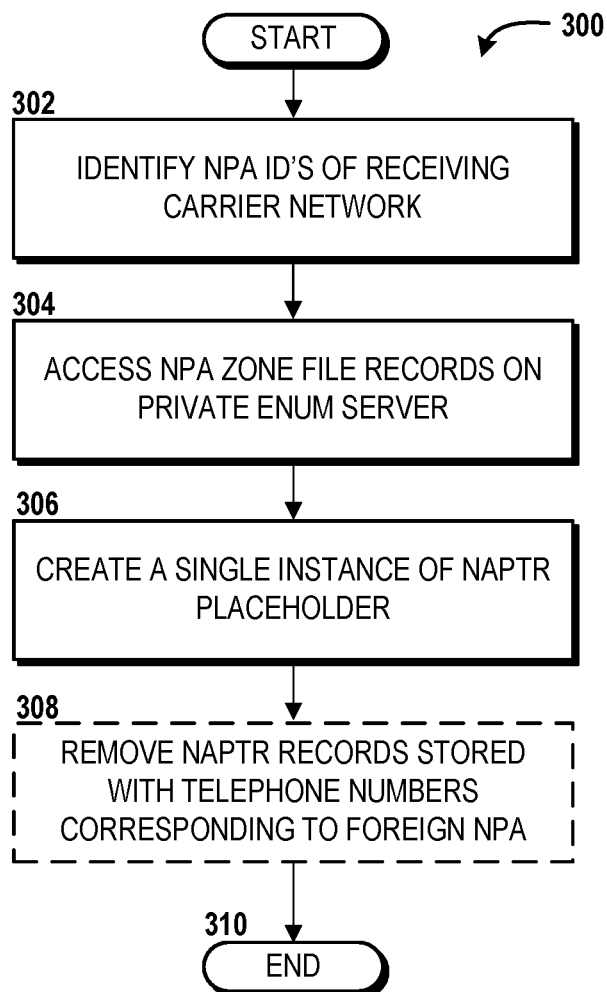
FIG. 3 is a flow diagram showing aspects of a method for enabling internet protocol peering to foreign network domains, according to an illustrative embodiment of the concepts and technologies described herein.
Figure 4:
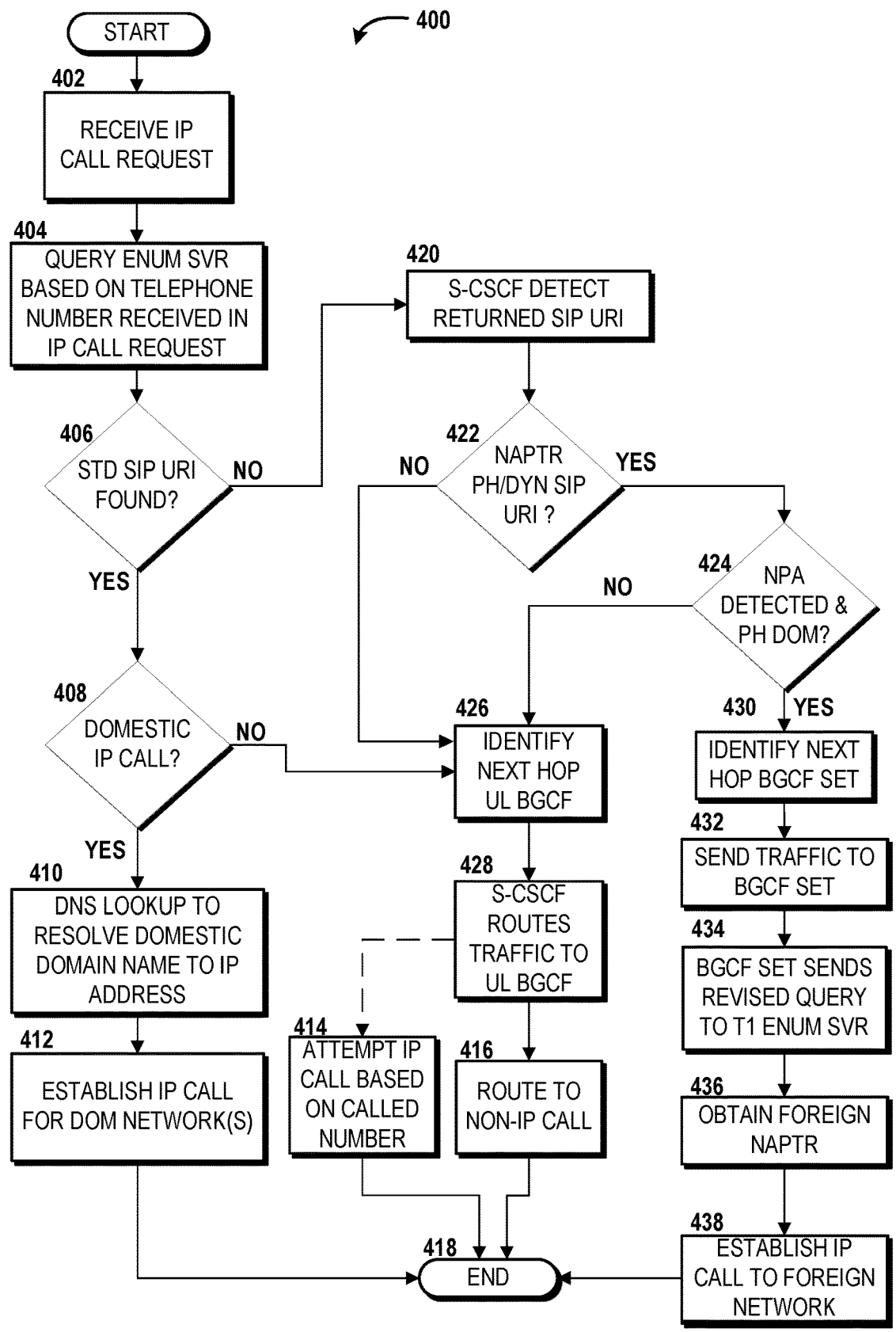
FIG. 4 is a flow diagram showing aspects of a method for providing internet protocol peering to foreign network domains, according to an illustrative embodiment of the concepts and technologies described herein.

Turning now to FIGS. 3 and 4, aspects of a method 300 for enabling internet protocol peering to foreign network domains and a method 400 for providing internet protocol peering to foreign network domains, will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the IMS core 108, the private enabled ENUM server 130, and/or any other device of the system 100, to perform one or more operations and/or causing the processor to direct other components of the computing system or device to perform one or more of the operations.

For purposes of illustrating and describing the concepts of the present disclosure, the methods disclosed herein are described as being performed, at least in part, by a computer system of the originating network 102 (e.g., one or more of the IMS core 108 and the private enabled ENUM server 130) via execution of one or more software modules such as, for example, an ENUM client 121 and/or the S-CSCF 112 that configures one or more processors. It should be understood that additional and/or alternative devices and/or network nodes can provide the functionality described herein via execution of one or more modules, applications, and/or other software including, but not limited to, the BGCF set 122. Thus, the illustrated embodiments are illustrative, and should not be viewed as being limiting in any way.

The method 300 will be described with reference to FIGS. 1 and 2A-2J. The method 300 begins and proceeds to operation 302, where the IMS core 108 can identify a plurality of foreign NPA IDs 110 that correspond with the receiving network 170. The IMS core 108 can reside within the originating network 102, which can be associated with a domestic carrier. As such, in some embodiments, the originating network 102 can be a domestic network that is associated with the domestic NPA IDs 111, where the domestic NPA IDs 111 are unique from the foreign NPA IDs 110. The receiving network 170 can be associated with a foreign carrier, which can be assigned one or more of the foreign NPA IDs 110. In some embodiments, the IMS core 108 can identify the plurality of foreign NPA IDs 110 corresponding with the receiving network 170 prior to receiving the IP call request 129 from the calling device 128.

From operation 302, the method 300 proceeds to operation 304, where the IMS core 108 can access at least one of the plurality of numbering plan area (NPA) zone file records (ZFR) 138 stored on the private enabled ENUM server 130. In some embodiments, the IMS core 108 can access the plurality of NPA ZFRs 138 based on the plurality of numbering plan area identifiers, such as one or more of the foreign NPA IDs 110 corresponding with the receiving network 170. The private enabled ENUM server 130 can be associated with the originating network 102 and be accessible to the IMS core 108.

From operation 304, the method 300 proceeds to operation 306, where the IMS core 108 and/or the private enabled ENUM server 130 can create a single instance of a name authority pointer record placeholder (e.g., the NAPTR placeholder 142) within each of the plurality of NPA ZFRs 138 stored on the private enabled ENUM server 130. In some embodiments, each numbering plane area zone file record of the plurality of NPA ZFRs 138 stored in the private enabled ENUM server 130 can include one, single name authority pointer record placeholder, such as the NAPTR placeholder 142. The NAPTR placeholder 142 can be included in one or more of the NPA ZFRs 138 instead of requiring one and/or a plurality of foreign name authority pointer records (e.g., the foreign NAPTR records 173A) that correspond with the foreign NPA IDs 110 having to be stored in the NPA ZFRs 138 of the private enabled ENUM server 130. Thus, the NAPTR placeholder 142 takes the place of the plurality of foreign NAPTR records 173A corresponding with the foreign NPA IDs 110 conventionally required to be stored in the private enabled ENUM server 130. The NAPTR placeholder 142 can instruct the private enabled ENUM server 130 to generate a unique enabled telephone number mapping response message (e.g., the unique ENUM response message 206) in response to receiving a private enabled telephone number mapping query that provides a telephone number to place an internet protocol call to the receiving carrier.

From operation 306, the method 300 optionally can proceed to operation 308, where the private enabled ENUM server 130 can remove from within each of the plurality of NPA ZFRs 138, a plurality of telephone numbers that can be stored as foreign NAPTR records corresponding to one of the plurality of foreign NPA IDs 110. For example, if one or more foreign NAPTR records 173A corresponding to one of the foreign NPA IDs 110 is stored in the memory 134, then the private enabled ENUM server 130 can delete any or even all foreign NAPTR records 173A from the NPA ZFRs 138 stored in the memory 134. By this, foreign NAPTR records 173A for telephone numbers and foreign NPA IDs 110 corresponding to the receiving network 170 will not exist within the private enabled ENUM server 130. However, when the private enabled ENUM server 130 receives a private ENUM query 200 requesting a foreign NAPTR associated with the receiving network 170, the private ENUM query 200 may not respond with a "record not found" message, such as the RNF message 136, but rather can use the NAPTR placeholder 142 to redirect the IMS core 108 to the EDT 120. In some embodiments, the single instance of the NAPTR placeholder 142 replaces the plurality of telephone numbers stored as separate foreign NAPTR records (e.g., the foreign NAPTR records 173A) within each of the numbering plan area zone file records (e.g., the NPA ZFRs 138). It should be understood that the examples discussed are for illustrative purposes only, and therefore the scope of the disclosure should not be construed as being limiting in any way. From operation 308, the method 300 proceeds to operation 310, where the method 300 ends.

Turning now to FIG. 4, aspects of the method 400 for providing internet protocol peering to foreign network domains, will be described in detail, according to an illustrative embodiment. The method 400 begins at operation 402, where the IMS core 108 can receive the IP call request 129 from the calling device 128, where the IP call request 129 can include the called telephone number 128A. From operation 402, the method 400 proceeds to operation 404 where the IMS core 108 can query the private enabled ENUM server 130 based on the telephone number 128A received in the IP call request 129. For example, the IMS core 108 can send the private ENUM query 200 to the private enabled ENUM server 130. The private ENUM query 200 can include the standard domain 202 that is prepended with the reverse telephone number 204 corresponding to the telephone number 128A. In some embodiments, the private enabled ENUM server 130 may have completed the method 300 for enabling IP carrier peering to foreign domains prior to operation 402. For example, the private enabled ENUM server 130 may have already created the NAPTR placeholder 142 within at least one of the NPA ZFRs 138 prior to the private ENUM query 200 being sent in the operation 402. As discussed above, the NAPTR placeholder 142 can replace at least some or all foreign NAPTR records 173A from being used and/or stored in the private enabled ENUM server 130.

From operation 404, the method 400 can proceed to operation 406 where a computer system of the IMS core 108 can receive a response from the private enabled ENUM server 130 after sending the private ENUM query 200. The IMS core 108 determines whether the response includes a standard SIP URI. The standard SIP URI may initially exist within a NAPTR record that is stored on the private enabled ENUM server 130. Thus, a standard SIP URI can be provided, in some embodiments, in a response to the IMS core 108 when a NAPTR record associated with the telephone number 128A exists instead of a NAPTR placeholder, such as the NAPTR placeholder 142. The private enabled ENUM server 130 can rely on the NAPTR record associated with the telephone number 128A that exists in the memory 134 to fulfill the private ENUM query 200. An example of a standard SIP URI can include a carrier domain, such as "example.carrier.net," according to an embodiment.

If the private enabled ENUM server 130 does not use a NAPTR placeholder 142 to create a unique ENUM response message containing the dynamic SIP URI 208, but instead provides the IMS core 108 with a response that uses a standard SIP URI based on a NAPTR record stored on the private enabled ENUM server 130, then the method 400 can proceed to operation 408. However, if the private enabled ENUM server 130 uses the NAPTR placeholder 142 to create the unique ENUM response message 206, and the IMS core 108 receives the unique ENUM response message 206 in response to the private ENUM query 200, where the unique ENUM response message 206 contains the dynamic SIP URI 208, then the IMS core 108 determines that the response does not include a standard SIP URI and the method 400 can proceed from operation 406 to operation 420. For clarity purposes only, an embodiment where a standard SIP URI is found, thereby proceeding to operation 408, will be discussed first.

If the method 400 proceeds to operation 408, the IMS core 108 can determine whether the telephone number 128A provided in the IP call request 129 pertains to a domestic IP call or a foreign IP call. The IMS core 108 can identify an NPA of the telephone number 128A provided in the IP call request 129 and can determine whether the NPA matches an NPA from the foreign NPA IDs 110 or the domestic NPA IDs 111.

If the NPA from the telephone number 128A corresponds with one of the foreign NPA IDs 110 and the standard SIP URI is provided in response to the private ENUM query 200, then the method 400 can proceed from operation 408 to operation 426, which is discussed below. However, if the NPA from the telephone number 128A matches one of the domestic NPA IDs 111, then the method 400 can proceed from operation 408 to operation 410. At operation 410, the IMS core 108, via the ENUM client 121, can perform a DNS lookup to resolve a domestic domain name and obtain a corresponding IP address for the domestic IP call. From operation 410, the method 400 can proceed to operation 412 where the IMS core 108 can establish a domestic IP call session to a call receiving device that is within the same originating network 102 that communicatively couples to the calling device 128. From operation 412, the method 400 can proceed to operation 418 where the method 400 can end.

Returning back to operation 406, if the method 400 proceeds to operation 420, the S-CSCF 112 can detect the returned SIP URI within the response sent from the private enabled ENUM server 130. From operation 420, the method 400 can proceed to operation 422, where the S-CSCF 112 can determine whether the response from the private enabled ENUM server 130 is the unique ENUM response message 206 that contain the dynamic SIP URI 208, thereby indicating that the NAPTR placeholder 142 was used.

If the S-CSCF 112, at operation 422, determines that the dynamic SIP URI 208 is not present and thus the NAPTR placeholder 142 was not used, then the S-CSCF 112 may not have found a match, in which case the S-CSCF 112 may seek to use an unlicensed BGCF, such as from the UL BGCF set 124. Thus, in this case, the method 400 would proceed from operation 422 to operation 426, which is discussed below. However, if the S-CSCF 112, at operation 422, determines that the response is the unique ENUM response message 206 that contains the dynamic SIP URI 208 then the method 400 can proceed from operation 422 to operation 424. At operation 424, the S-CSCF 112 can detect whether the dynamic SIP URI 208 of the unique ENUM response message 206 contains the placeholder domain 142A and whether the NPA included in the unique ENUM response message 206 belongs to a set of BGCFs that are licensed to use the ENUM standard, such as the BGCF set 122, or a set of BGCFs that are unlicensed to use the ENUM standard, such as the UL BGCF set 124.

If the S-CSCF 112 does not find both the placeholder domain 142A and an NPA that corresponds with use of the BGCF set 122, then the method 400 proceeds from operation 424 to operation 426. At operation 426, the S-CSCF 112 can identify that a next hop FQDN points to the UL BGCF set 124, which can be included in a general pool of BGCFs that are used to set up calls. From operation 426, the method 400 can proceed to operation 428 where the S-CSCF 112 can route call traffic to the UL BGCF set 124.

In some embodiments, the method 400 can optionally proceed to operation 414, where the IMS core 108 (e.g., via the S-CSCF 112 and/or the UL BGCF set 124) can attempt to complete the IP call request using the received telephone number provided without verifying whether the IP call session 224 will take place, and in some instances instead of denying the IP call request and routing to a non-IP connection, such as discussed in operation 416 below.

In some embodiments, the received telephone number may be ported and/or not associated with a CRD that can receive IP calls (i.e., not an IP endpoint device), and thus may result in the attempted setup of an IP call session being denied by a foreign network (e.g., the receiving network 170). The setup of the IP call session may be denied because adequate routing information may not be provided by the standard SIP URI to allow a foreign IP call session to occur. However, the IMS core 108 (e.g., via the S-CSCF 112 and/or the UL BGCF set 124) may rely on the receiving (foreign) network 170 (or other network) to request setup of an IP call session, thereby attempting to use the received telephone number as a trigger for an IP call, which may go through if the CRD can handle an IP call; however, attempted request may result in denial of the IP call session, thereby causing the IP call request 129 to be routed through a non-IP call path (e.g., PSTN). It is understood that that unverified IP call session attempts (based on using the received telephone number when a foreign NAPTR record does not exist) can be avoided via the use of the NAPTR placeholder 142, such as provisioned in the private enabled ENUM server 130. From operation 414, the method 400 can proceed to operation 418 where the method 400 can end.

In another embodiment, from operation 428, the method 400 can proceed to operation 416 where the IMS core 108 can set up and/or route the call request to a call receiving device via a non-IP call path, such as via cellular and/or PTSN. From operation 416, the method 400 can proceed to operation 418 where the method 400 can end.

Returning to operation 424, if the S-CSCF 112 finds the placeholder domain 142A and an NPA that corresponds with use of the BGCF set 122, then the method 400 can proceed from operation 424 to operation 430. At operation 430, the S-CSCF 112 can identify that a next hop FQDN points to ENUM-enabled BGCFs, such as the BGCF set 122. From operation 430, the method 400 proceeds to operation 432 where the S-CSCF 112 sends call traffic to one or more BGCF from the BGCF set 122. From operation 432, the method 400 can proceed to operation 434 where the BGCF set 122 can send the revised ENUM query 214 to the IPX Tier 1 ENUM server 152, where in some embodiments the revised ENUM query 214 can be based on DNS name server record information from IPX Tier 1 ENUM server IP addresses. From operation 434, the method 400 can proceed to operation 436, where the BGCF set 122 can be used to obtain a foreign NAPTR from the foreign network (e.g., the receiving network 170 in an embodiment). From operation 436, the method 400 can proceed to operation 438 where the BGCF set 122 can establish the foreign IP call session 224 via a communication path and SBC identified by the foreign NAPTR response 222. The foreign IP call session 224 can connect the calling device 128 with the call receiving device 125. From operation 438, the method 400 can proceed to operation 418 where the method 400 ends.

Figure 5:
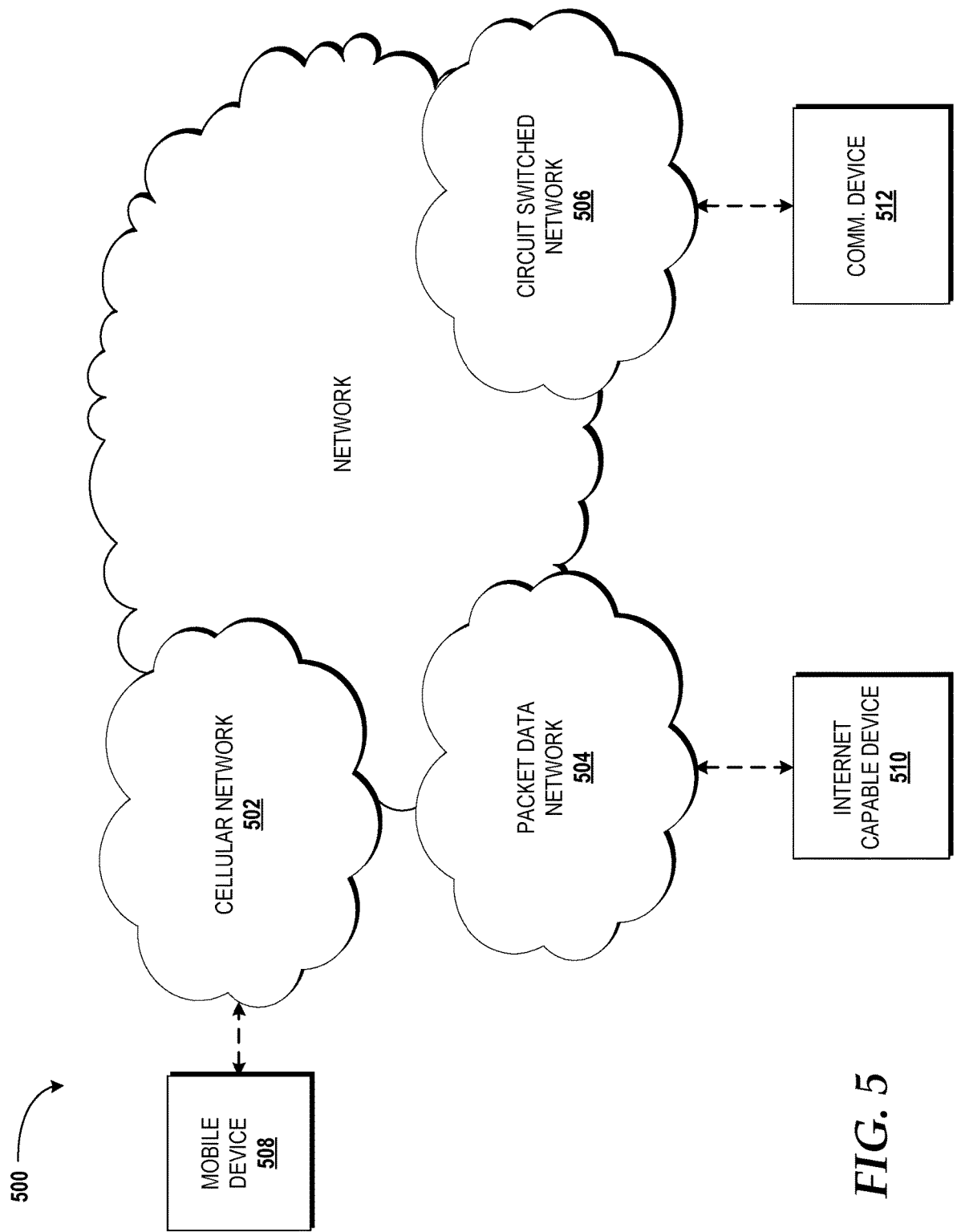
FIG. 5 schematically illustrates an example network capable of implementing aspects of the embodiments presented herein.

Turning now to FIG. 5, details of a network 500 are illustrated, according to an illustrative embodiment. In some embodiments, any of the originating network 102, the IPX-P network 150, and/or the receiving network 170 can be configured to operate according to features discussed with respect to the network 500. For example, any of the originating network 102, the IPX-P network 150, and/or the receiving network 170 can include a cellular network 502, a packet data network 504 (e.g., the Internet), and a circuit switched network 506, (e.g., a publicly switched telephone network ("PSTN")). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

The calling device 128 and/or the call receiving device 125 can include an instance of a mobile communication device 508. The mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, any of the originating network 102, the IPX-P network 150, and the receiving network 170 can include any combination of the networks 502, 504, 506. It should be appreciated that, in some embodiments, substantially all of the functionality described with reference to the originating network 102, the IPX-P network 150, and/or the receiving network 170 can be performed by the cellular network 502, the packet data network 504, and/or the circuit switched network 506, alone or in combination with other networks, network elements, and the like. Although not illustrated separately in FIG. 5, it should be understood that the IMS core 108 can, in some embodiments, be a part of the cellular network 502, though this may not necessarily be the case in various embodiments.

Figure 6:
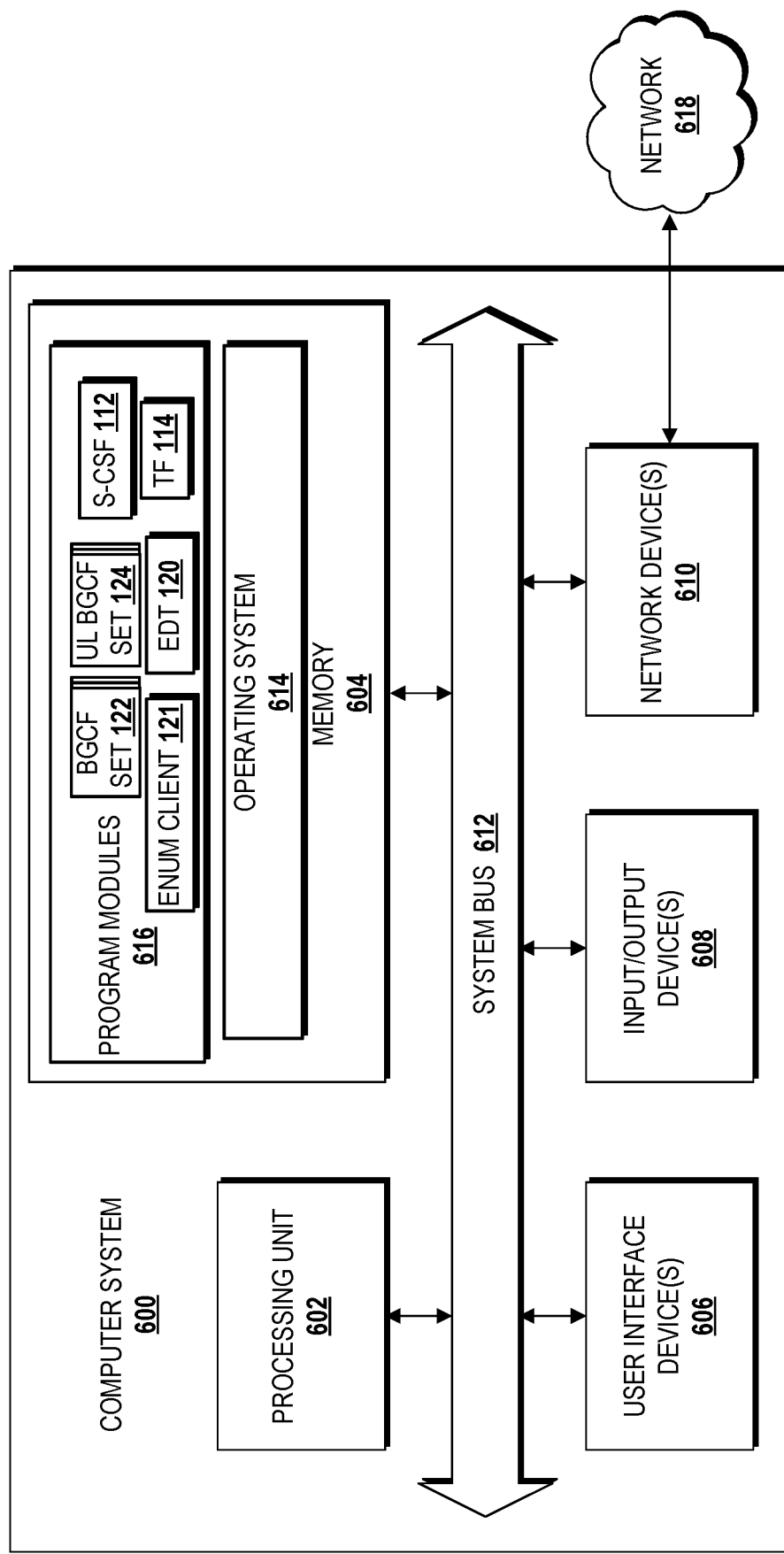
FIG. 6 is a block diagram illustrating an example computer system capable of implementing aspects of the embodiments presented herein.

FIG. 6 is a block diagram illustrating a computer system 600 configured to provide the functionality described herein for enabling and engaging in IP carrier peering so as to provide an IP call session to foreign network domains, such as the receiving network 170, in accordance with various embodiments of the concepts and technologies disclosed herein. In aspects, the IMS core 108 and/or the private enabled ENUM server 130 illustrated and described herein can be configured as and/or can have an architecture similar or identical to the computer system 600. In some embodiments, the IPX Tier 1 ENUM server 152, the DNS server 160, and the Tier 2 ENUM server 172 can be configured as and/or have an architecture that is similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 can include an ENUM client 121, the S-CSCF 112, the Transit Function 114, the BGCF set 122, the EDT 120, the UL BGCF set 124, the NAPTR placeholder 142, and/or other program modules. These and/or other programs can be embodied in computer-readable media containing instructions that, when executed by the processing unit 602, perform one or more of the methods 300, 400 described in detail above with respect to FIGS. 3-4. According to some embodiments, the program modules 616 may be embodied in hardware, software, firmware, or any combination thereof. Although not shown in FIG. 6, it should be understood that the memory 604 also can be configured to store the EDT 120, the foreign NPA IDs 110, the domestic NPA IDs 111, the NPA ZFR 138, the BGCF set IPs 166, the Tier 2 ENUM server FQDN NSR 158, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 618. The network 618 can include one or more of the originating network 102, the IPX-P network 150, and/or the receiving network 170. Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 618 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
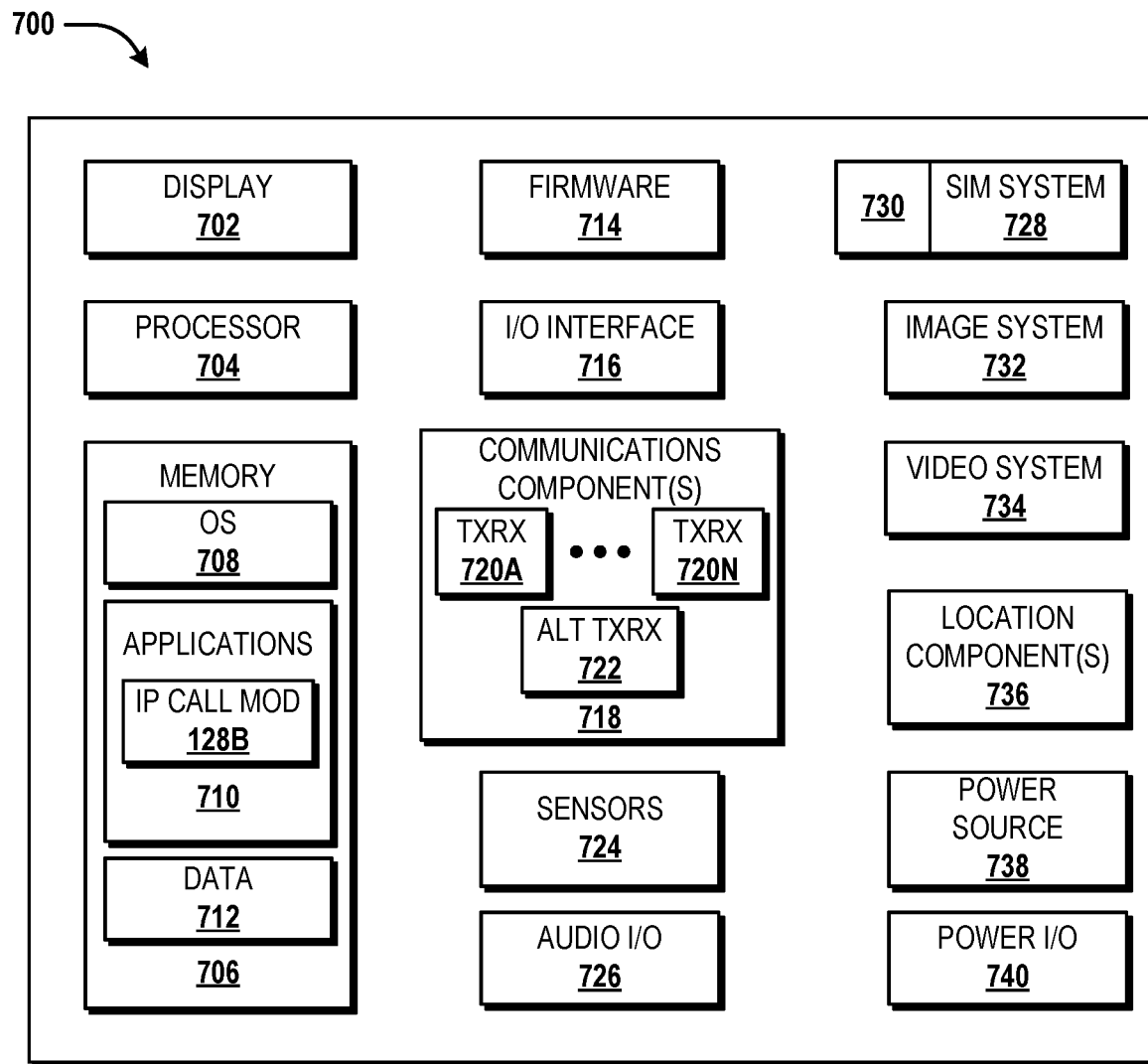
FIG. 7 is a block diagram illustrating an example mobile device capable of implementing aspects of the embodiments disclosed herein.

Turning now to FIG. 7, an illustrative mobile device 700 and components thereof will be described. In some embodiments, the calling device 128, the call receiving device 125, and/or other devices illustrated and described herein can be configured as and/or can have an architecture similar or identical to the mobile device 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements for placing, accepting, and/or engaging in the IP call session 224, providing text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as an IP call module 128B that allows for the creation of the IP call request 129 and engagement of the IP call session 224, and/or other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT COR- PORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, creating the IP call request 129, engaging in the IP call session 224, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as the telephone number 128A used to place the IP call request 129, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as any of the originating network 102, the IPX-P network 150, and the receiving network 170 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, LTE-U, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for providing and using a routing service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A method comprising:
   identifying, by a computer system executing within an originating carrier network, a plurality of numbering plan area identifiers corresponding to a receiving carrier network;
   accessing, by the computer system, a plurality of numbering plan area zone file records corresponding to the plurality of numbering plan area identifiers, wherein the plurality of numbering plan area zone file records are stored on a private enabled telephone number mapping server associated with the originating carrier network, and wherein at least a portion of the plurality of numbering plan area zone file records comprises a plurality of name authority pointer records;
   creating, by the computer system, a single instance of a name authority pointer record placeholder within each of the plurality of numbering plan area zone file records stored on the private enabled telephone number mapping server; and
   replacing, by the computer system, the plurality of name authority pointer records with the single instance of the name authority pointer record placeholder.

2. The method of claim 1, wherein the originating carrier network is associated with a domestic carrier and the receiving carrier network is associated with a foreign carrier.

3. The method of claim 1, wherein the name authority pointer record placeholder instructs the private enabled telephone number mapping server to generate a unique enabled telephone number mapping response message in response to receiving a private enabled telephone number mapping query that provides a telephone number to place an internet protocol call to the receiving carrier network.

4. The method of claim 3, wherein the name authority pointer record placeholder comprises a placeholder domain.

5. The method of claim 4, wherein the placeholder domain can be appended to the telephone number to form a dynamic session internet protocol uniform resource identifier.

6. The method of claim 3, wherein the unique enabled telephone number mapping response message directs the originating carrier network to access an external domain table.

7. A computer system comprising:
a processor; and
a memory that stores computer-executable instructions that, when executed by the processor, cause the processor to perform operations comprising
identifying a plurality of numbering plan area identifiers corresponding to a receiving carrier network, wherein the computer system executes within an originating carrier network,
accessing a plurality of numbering plan area zone file records corresponding to the plurality of numbering plan area identifiers, wherein the plurality of numbering plan area zone file records are stored on a private enabled telephone number mapping server associated with the originating carrier network, and wherein at least a portion of the plurality of numbering plan area zone file records comprises a plurality of name authority pointer records,
creating a single instance of a name authority pointer record placeholder within each of the plurality of numbering plan area zone file records stored on the private enabled telephone number mapping server, and
replacing the plurality of name authority pointer records with the single instance of the name authority pointer record placeholder.

8. The computer system of claim 7, wherein the originating carrier network is associated with a domestic carrier and the receiving carrier network is associated with a foreign carrier.

9. The computer system of claim 7, wherein the name authority pointer record placeholder instructs the private enabled telephone number mapping server to generate a unique enabled telephone number mapping response message in response to receiving a private enabled telephone number mapping query that provides a telephone number to place an internet protocol call to the receiving carrier network.

10. The computer system of claim 9, wherein the name authority pointer record placeholder comprises a placeholder domain.

11. The computer system of claim 10, wherein the placeholder domain can be appended to the telephone number to form a dynamic session internet protocol uniform resource identifier.

12. The computer system of claim 9, wherein the unique enabled telephone number mapping response message directs the originating carrier network to access an external domain table.

13. A computer storage medium having computer-executable instructions stored thereon that, in response to execution by a processor of a computer system, cause the processor to perform operations comprising:
identifying a plurality of numbering plan area identifiers corresponding to a receiving carrier network, wherein the computer system executes within an originating carrier network;
accessing a plurality of numbering plan area zone file records corresponding to the plurality of numbering plan area identifiers, wherein the plurality of numbering plan area zone file records are stored on a private enabled telephone number mapping server associated with the originating carrier network, and wherein at least a portion of the plurality of numbering plan area zone file records comprises a plurality of name authority pointer records,
creating a single instance of a name authority pointer record placeholder within each of the plurality of numbering plan area zone file records stored on the private enabled telephone number mapping server; and
replacing the plurality of name authority pointer records with the single instance of the name authority pointer record placeholder.

14. The computer storage medium of claim 13, wherein the originating carrier network is associated with a domestic carrier and the receiving carrier network is associated with a foreign carrier.

15. The computer storage medium of claim 13, wherein the name authority pointer record placeholder instructs the private enabled telephone number mapping server to generate a unique enabled telephone number mapping response message in response to receiving a private enabled telephone number mapping query that provides a telephone number to place an internet protocol call to the receiving carrier network.

16. The computer storage medium of claim 15, wherein the name authority pointer record placeholder comprises a placeholder domain, and wherein the placeholder domain can be appended to the telephone number to form a dynamic session internet protocol uniform resource identifier.

17. The computer storage medium of claim 15, wherein the unique enabled telephone number mapping response message directs the originating carrier network to access an external domain table.

* * * * *